United States Patent
Shimazaki et al.

(10) Patent No.: US 7,038,873 B2
(45) Date of Patent: May 2, 2006

(54) MAGNETIC RECORDING MEDIUM HAVING A SPECIFIC RELATION OF COERCIVE FORCE HC AND RESIDUAL MAGNETIZATION MR IN PERPENDICULAR DIRECTION TO SUBSTRATE SURFACE

(75) Inventors: Katsusuke Shimazaki, Toride (JP); Satoshi Matsunuma, Kamakura (JP); Teruaki Takeuchi, Moriya (JP); Norio Ota, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/747,063

(22) Filed: Dec. 30, 2003

(65) Prior Publication Data

US 2004/0184176 A1   Sep. 23, 2004

(30) Foreign Application Priority Data

| | | | |
|---|---|---|---|
| Mar. 20, 2003 | (JP) | | 2003-078356 |
| Apr. 10, 2003 | (JP) | | 2003-106465 |
| Apr. 28, 2003 | (JP) | | 2003-123455 |
| Jun. 27, 2003 | (JP) | | 2003-184137 |

(51) Int. Cl.
   *G11B 5/02*   (2006.01)

(52) U.S. Cl. ............... 360/59; 360/131; 428/694 MM; 369/13.41

(58) Field of Classification Search ............ 360/55, 360/131, 135, 59; 428/694 MM, 694 EC, 428/694 TM, 694 BM; 369/13.01, 13.39, 369/13.24, 13.41, 13.43, 13.44, 13.46, 13.48, 369/13.49, 13.51

See application file for complete search history.

(56) References Cited

U.S. PATENT DOCUMENTS 6,818,331 B1 * 11/2004 Sakawaki et al. ...... 428/694 TS
6,824,817 B1 * 11/2004 Araki et al. ................ 427/131

FOREIGN PATENT DOCUMENTS

| JP | 5-28454 A | 2/1993 |
|---|---|---|
| JP | 2000-315310 A | 11/2000 |
| JP | 2002-216333 A | 8/2002 |

* cited by examiner

*Primary Examiner*—Alan T. Faber
(74) *Attorney, Agent, or Firm*—Birch, Stewart, Kolasch & Birch, LLP

(57) ABSTRACT

A perpendicular magnetic recording medium has a substrate, a magnetic functional layer provided on the substrate, and a magnetic recording layer stacked in contact with the magnetic functional layer and having perpendicular magnetic anisotropy. $-4 \times 2\pi Ms^2 \leq Ku \leq 6 \times 2\pi Ms^2$ is satisfied, wherein Ku represents a perpendicular magnetic anisotropy constant of the magnetic functional layer and Ms represents a saturation magnetization. The magnetic moment of the magnetic functional layer is rotated in a direction of an applied magnetic field during the recording, and the magnetic moment acts on the magnetization of the recording layer in such a manner that the applied magnetic field is assisted thereby. Minute magnetic domains can be stably retained and excellent thermal disturbance resistance can be obtained.

23 Claims, 16 Drawing Sheets

Fig. 6
(a)
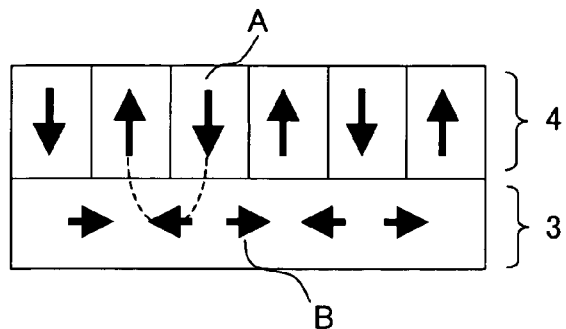
(b)
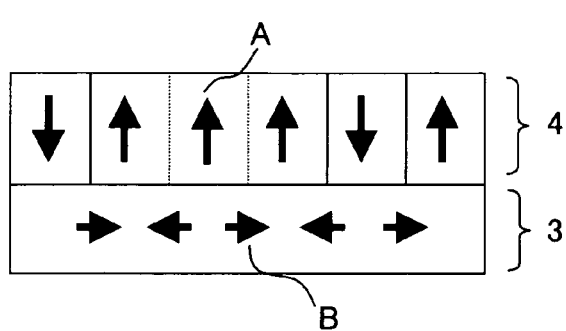
(c)
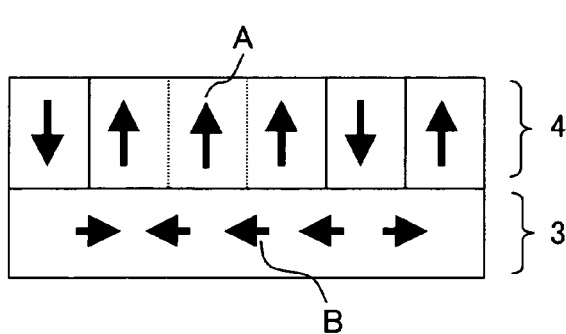
(d)
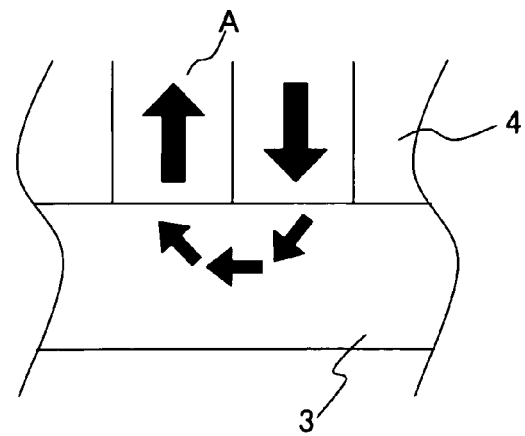

MAGNETIC RECORDING MEDIUM HAVING A SPECIFIC RELATION OF COERCIVE FORCE HC AND RESIDUAL MAGNETIZATION MR IN PERPENDICULAR DIRECTION TO SUBSTRATE SURFACE

BACKGROUND OF THE INVENTION

1. Field of the Invention

The present invention relates to a perpendicular magnetic recording medium capable of recording information at a high density, a recording method therefor, and a magnetic recording apparatus provided with the magnetic recording medium.

2. Description of the Related Art

As the information network is developed and the multimedia comes into the widespread use, the magnetic disk apparatus, which is the major information-recording apparatus for supporting such circumstances, encounters important problems of the realization of small size, low price, and large capacity and the improvement in reliability. In such a situation, the perpendicular magnetic recording medium is noticed, which is strongly resistant to the thermal fluctuation as compared with the in-plane or longitudinal magnetic recording medium and on which the recording can be performed at a high density. As for the perpendicular magnetic recording medium, those suggested as the recording layer include, for example, CoCr-based polycrystalline films, so-called multi layer thin films obtained by alternately stacking or laminating multiple layers of Co and Pd, and superlattice alloy films.

In relation to the perpendicular magnetic recording medium, the present applicant has disclosed a structure in which an in-plane magnetize layer is added in contact with a recording layer in order to form fine and minute magnetic domains in Japanese Patent Application Laid-open No. 2002-216333. In this structure, the recording layer and the in-plane magnetized layer are exchange-coupled. The magnetization is stabilized while being slightly inclined with respect to the film surface in the vicinity of the interface between the both layers. Therefore, the magnetization of the recording layer includes an in-plane component. On this condition, when an external magnetic field, which is in a direction opposite to that of the magnetization of the recording layer, is applied, the magnetization of the recording layer is reversed more easily by the external magnetic field, because the magnetization of the recording layer includes the in-plane component. Accordingly, the magnetic field to start the magnetization reversal is lowered.

However, it is necessary that the thermal stability of the recording magnetic domain is further improved in a high density recording area of not less than 100 gigabits/square inch (Gb/in$^2$), especially not less than 500 gigabits/square inch. Japanese Patent Application Laid-open No. 2002-216333 described above discloses nothing about the enhancement of the stability of the recording magnetic domain against the thermal disturbance to be caused when the high density recording is performed as described above. That is, the patent document neither teaches nor suggests the condition and the medium structure to simultaneously exhibit such functions intrinsically required for the realization of the high density that the recording is assisted and the recorded magnetic domains are stabilized during the storage so that the information is hardly erased, especially the relationship between the residual magnetization in the perpendicular direction and the coercive force (coercivity) in the in-plane direction of the magnetic recording medium.

SUMMARY OF THE INVENTION

The present invention has been made in order to solve the problem of the thermal stability in relation to the perpendicular magnetic recording medium, an object of which is to provide a perpendicular magnetic recording medium which is capable of stably preserving or retaining minute magnetic domains in a recording layer and which has excellent thermal disturbance resistance, a recording method therefor, and a magnetic recording apparatus which is provided with the magnetic recording medium. The present invention is especially effective for the magnetic recording medium for performing the recording at a high density of not less than 100 gigabits/square inch and the magnetic recording apparatus provided with the same.

According to a first aspect of the present invention, there is provided a magnetic recording medium comprising a substrate, a magnetic functional layer which is provided on the substrate, and a magnetic recording layer which has perpendicular magnetic anisotropy, wherein the following expression is satisfied:

$$-4 \times 2\pi Ms^2 \leq Ku \leq 6 \times 2\pi Ms^2 \tag{1}$$

provided that Ku represents a perpendicular magnetic anisotropy constant of the magnetic functional layer and Ms represents a saturation magnetization, and wherein the magnetic functional layer has a coercive force in an in-plane direction. When the expression (1) is satisfied, then the magnetic moment of the magnetic functional layer is rotated in a direction of an applied magnetic field during the recording, and the magnetic moment acts on the magnetization of the recording layer in such a manner that the applied magnetic field is assisted thereby. Therefore, it is possible to improve S/N of the reproduced signal when the high density recording is performed. Further, it is possible to decrease the magnetic field which is required for the recording.

According to a second aspect of the present invention, there is provided a magnetic recording medium comprising a substrate, and a magnetic recording layer which is provided directly or indirectly on the substrate and which has an axis of easy magnetization in a direction perpendicular to a substrate surface, wherein the following relational expression is satisfied:

$$0.05 \leq Hc/Mr \leq 2.5 \tag{2}$$

provided that Hc (Oe) represents a coercive force of the magnetic recording medium in a direction perpendicular to a recording track in an in-plane direction of the magnetic recording medium, and Mr (emu/cc) represents a residual magnetization of the magnetic recording medium in the direction perpendicular to the substrate surface. Hc/Mr is an index to represent the stability of the recording magnetization (hereinafter referred to as "magnetization stability factor" or "first magnetization stability factor"). The inventors have found out that the stability of the recording magnetization greatly depends on the magnetization stability factor Hc/Mr as explained later on. Further, the inventors have found out that the satisfactory thermal stability is obtained for the magnetic recording medium when the magnetization stability factor Hc/Mr is within the range of the expression (2) as shown in FIG. 16. Accordingly, the inventors have succeeded in obtaining the magnetic recording medium having satisfactory S/N by adjusting the magnetization stability factor Hc/Mr to be within the range described above during the production of the information-recording medium. In the magnetic recording medium of the present invention, it is desirable that Mr satisfies the following expression:

$$50 \leq Mr \leq 500 \qquad (3)$$

According to a third aspect of the present invention, there is provided a magnetic recording medium comprising a substrate, and a magnetic recording layer which is provided directly or indirectly on the substrate and which has an axis of easy magnetization in a direction perpendicular to a substrate surface, wherein the following relational expression is satisfied:

$$0.8 \times 10^4 \leq Hc/M \leq 0.5 \times 10^7 \qquad (4)$$

provided that Hc (Oe) represents a coercive force of the magnetic recording medium in a direction perpendicular to a recording track in an in-plane direction of the magnetic recording medium, and M (emu/cm$^2$) represents a residual magnetic moment per unit area of the magnetic recording medium as measured in the direction perpendicular to the substrate surface. Hc/M is an index to represent the stability of the recording magnetization found out by the inventors (hereinafter appropriately referred to as "magnetization stability factor" or "second magnetization stability factor"). When the second magnetization stability factor is within the range described above, the satisfactory thermal stability is obtained in relation to the magnetic recording medium. Accordingly, it is possible to obtain the magnetic recording medium having satisfactory S/N. As for the magnetic recording medium of the present invention, it is desirable that M satisfies the following expression:

$$0.03 \times 10^{-3} \leq M \leq 3 \times 10^{-3} \qquad (5)$$

Each of the magnetic recording media according to the second and third aspects may further comprise a magnetic functional layer which is provided together with the recording layer. In the present invention, the magnetic functional layer may be an alloy layer containing at least Co and Pt or Pd, or an alternately stacked multilayer film which is composed of, for example, one or more layers containing Co and one or more layers containing Pt or Pd. The magnetic functional layer may contain oxygen by 5 to 20 at. %. When the recording layer and the magnetic functional layer are formed of multilayer films having identical components, a boundary, at which the film thickness of the multilayer film is changed, may exist between the recording layer and the magnetic functional layer. The recording layer may be a multilayer film in which one or more layers containing Pd and one or more layers containing Co are alternately stacked. The magnetic recording medium of the present invention may further comprise a CoCrRu layer as an under layer.

According to another aspect of the present invention, there is provided a magnetic recording medium comprising a substrate, a magnetic functional layer which is provided on the substrate, and a magnetic recording layer which is stacked on the magnetic functional layer and which has perpendicular magnetic anisotropy, wherein:

the magnetic functional layer has perpendicular magnetic anisotropy energy which is substantially equal to shape magnetic anisotropy energy; and the magnetic functional layer has a coercive force in an in-plane direction. In the present invention, the magnetic moment of the magnetic functional layer is easily rotated in the direction of the applied magnetic field upon the recording, because the perpendicular magnetic anisotropy energy of the magnetic functional layer is substantially equal to the shape magnetic anisotropy energy. The term "shape magnetic anisotropy energy" herein refers to the apparent magnetic anisotropy energy generated by the demagnetizing field brought about in the magnetic member depending on the shape of the magnetic member. When a thin film-shaped magnetic member, which has a saturation magnetization of Ms, is magnetized in the perpendicular direction, a state is given, in which the shape magnetic anisotropy energy corresponding to $2\pi Ms^2$ is added as compared with a state of magnetization in the in-plane direction.

According to a fourth aspect of the present invention, there is provided a recording method on the magnetic recording medium as defined in each of the aspects described above, the recording method comprising heating a recording portion of the magnetic recording medium and applying a recording magnetic field during recording.

According to a fifth aspect of the present invention, there is provided a magnetic recording apparatus provided with the magnetic recording medium as defined in each of the aspects described above, the magnetic recording apparatus comprising:

a magnetic head which records and/or reproduces information; and a drive unit which drives the magnetic recording medium with respect to the magnetic head.

According to a sixth aspect of the present invention, there is provided a magnetic recording apparatus provided with the magnetic recording medium as defined in each of the aspects described above, the magnetic recording apparatus comprising:

a magnetic head provided with a device which records and/or reproduces information and a light-radiating device which raises a temperature of a recording portion; and a drive unit which drives the magnetic recording medium with respect to the magnetic head.

An explanation will be made below about the function and the principle of the recording and the reproduction on the magnetic recording medium of the present invention, while making classification into the function in relation to the recording and the function in relation to the retention or preservation of information.

Function in Relation to Recording

When the magnetic recording medium comprises at least the substrate, the magnetic functional layer which is carried on the substrate, and the magnetic recording layer which has the perpendicular magnetic anisotropy with respect to the magnetic functional layer, wherein the following expression is satisfied:

$$-4 \times 2\pi Ms^2 \leq Ku \leq 6 \times 2\pi Ms^2 \qquad (1)$$

provided that Ku represents the perpendicular magnetic anisotropy constant of the magnetic functional layer and Ms represents the saturation magnetization, then the magnetic moment of the magnetic functional layer is rotated in the direction of the applied magnetic field during the recording, and the magnetic moment acts on the magnetization of the recording layer in such a manner that the applied magnetic field is assisted thereby.

The magnetic characteristics of the magnetic functional layer are established so that the magnetic moment is easily rotated in the direction of the recording magnetic field. The magnetic functional layer exerts the exchange coupling force on the magnetic moment of the recording layer so that the magnetic moment of the recording layer is parallel to the magnetic moment of the magnetic functional layer. As a result, when the magnetic moment of the magnetic functional layer is rotated in the direction of the recording magnetic field, the function is exerted so that the magnetic moment of the recording layer is also rotated in the direction of the recording magnetic field by the aid of the exchange coupling force. The magnetic moment of the magnetic functional layer, which has been rotated by the recording magnetic field in the direction of the recording magnetic field, acts on the magnetic moment of the recording layer as the magnetic field added to the recording magnetic field, i.e., as the so-called bias magnetic field. The bias magnetic field acts on the recording layer in the direction of the magnetic moment of the magnetic functional layer. That is, the bias action is effected in the upward direction when the recording magnetic field is directed upwardly, or in the downward direction when the recording magnetic field is directed downwardly. Owing to the bias function of the recording magnetic field, it is possible to reliably record the magnetization information in the minute magnetic domains.

The inventors have quantitatively analyzed and investigated the condition under which "the magnetic moment of the magnetic functional layer tends to be rotated in the direction of the recording magnetic field". In general, when a magnetic member has a thin film shape, the action is exerted so that the magnetic moment is directed in the in-plane direction. The magnetic field, which exerts the action as described above, is called "demagnetizing magnetic field". Assuming that Ms represents the saturation magnetization of the magnetic thin film, the difference in energy, which corresponds to $2\pi Ms^2$, is generated by the demagnetizing magnetic field between when the magnetic moment is directed in the in-plane direction and when the magnetic moment is directed in the perpendicular direction. Accordingly, the range of the perpendicular magnetic anisotropy energy has been prescribed, in which the magnetic thin film tends to be rotated in the direction of the perpendicularly applied magnetic field, with respect to the energy of the demagnetizing magnetic field. This range is the range which is specified by the expression (1) described above.

When $(Ku-2\pi Ms^2)$ is negative, the magnetic functional layer is the in-plane magnetized layer. When $(Ku-2\pi Ms^2)$ is positive, the magnetic functional layer is the perpendicular magnetized layer. As far as Ku is within the range of the expression (1), the magnetic thin film is in the state in which the magnetic moment is easily rotated in the direction obtained when the magnetic field is applied in the perpendicular direction. The magnetic moment of the magnetic functional layer is rotated in the direction of the recording magnetic field, the magnetic coupling force such as the exchange coupling is exerted on the recording layer, and the action is effected so that the recording magnetic field is assisted thereby. When Ku satisfies the condition of the expression (1), S/N of the reproduced signal, which is obtained when the high density recording is performed, exhibits a satisfactory value as illustrated in Examples described later on. This is equivalent to such an effect that the magnitude of the magnetic field applied during the recording is effectively increased. That is, the switching time is substantially shortened in the direction of the application of the magnetic field. The running distance of the recording medium is shortened with respect to the switching time of the recording magnetic field, and the length (width) in the track direction of the transition area between the magnetic domain directed upwardly and the magnetic domain directed downwardly is shortened (the transition area becomes distinct). Usually, in the transition area, for example, the meandering of the domain wall occurs, which is one of the causes to generate the noise in the signal. As for the transition area, as the recording density is high, the relative length with respect to the reversal cycle in the magnetization direction becomes longer. Therefore, it is effective to shorten the length of the transition area for S/N of the signal.

Function in Relation to Retention of Information

When recording information is stored or preserved, the magnetization of the magnetic functional layer has the following function. That is, the magnetization of the magnetic functional layer forms a U-shaped magnetization arrangement together with the magnetizations of two bits which are adjacent to one another in the recording layer and which have mutually opposite directions of magnetization. The magnetization of the recording layer is stabilized by the coercive force in the in-plane direction possessed by the magnetization of the magnetic functional layer to avoid any thermal instability of the recording magnetization which would be otherwise caused by the high density recording (see FIG. 6(a)).

An explanation will be made about the function to secure the stability against the thermal disturbance in the magnetic recording medium of the present invention.

On the perpendicular magnetic recording medium, the recording is performed with the magnetization in the direction perpendicular to the film surface. Therefore, the magnetic fields, which are generated by the respective recording magnetizations, have the function to mutually stabilize the magnetizations. On the other hand, as shown in FIG. 5, the action to direct the mutual magnetizations in the parallel direction is exerted by the exchange interaction (exchange coupling force) between the adjoining magnetic domains. When the action is intense as compared with the perpendicular magnetic anisotropy, then the magnetic domain is reversed and/or the domain wall is moved or displaced as the time elapses. Due to the phenomenon as described above, the time-dependent change of the recording magnetic domain is caused by the thermal disturbance, which causes the problem concerning the performance of retention of information.

In order to provide the means for solving this problem, the magnetic functional layer, which has the coercive force at least in the in-plane direction, is stacked or laminated between the substrate and the recording layer in the present invention. This structure has such an effect that the function to reverse the recording magnetic domain, which is brought about by the exchange interaction between the adjoining magnetic domains, is suppressed as described later on. Accordingly, it is possible to improve the thermal stability of the recording magnetic domain.

FIG. 6 schematically shows exemplary structures of the magnetic functional layer and the recording layer stacked on the substrate. When the coercive force of the magnetic functional layer 3 is low to some extent, as shown in FIG. 6(a), a magnetization pattern, which corresponds to a magnetization pattern recorded in the recording layer 4, is generated in the in-plane direction in the magnetic functional layer 3 in a state in which pieces of magnetization information are recorded in directions of the arrows in the recording layer 4.

In general, when the perpendicular magnetized film and the in-plane magnetized film are formed and magnetically coupled to one another by the exchange coupling or the magnetostatic coupling, the stabilization is effected when the magnetic moments are parallel to one another in the vicinity of the interface between the both layers. When the magnetic functional layer 3 is magnetically coupled to the recording layer 4 which is the perpendicular magnetized film, as shown in FIG. 6(d), the magnetizations, which are disposed in the vicinity of the interface between the both layers, are inclined with respect to the film surface to couple the magnetization of the perpendicular magnetized film and the magnetization of the in-plane magnetized film while continuously changing the angle.

The coupling of the perpendicular magnetized film and the in-plane magnetized film is arranged so that a closed magnetic path is formed for the magnetizations of the recording magnetic domains. The closed magnetic path is depicted by a dotted line in FIG. 6(a). In this state, for example, it is assumed that the downwardly directed recording magnetic domain A is magnetically reversed in the upward direction similarly to the adjoining magnetic domains as shown in FIG. 6(a). When the recording magnetic domain A is reversed in the upward direction as shown in FIG. 6(b), the direction of magnetization B in the magnetic functional layer 3 is unstable in the rightwardly directed state, which becomes stable in view of the energy when the change is made to the leftwardly directed state as shown in FIG. 6(c). The stability of the energy may be actively utilized as follows. That is, when the magnetization of the recording layer 4 is in the downwardly directed state as represented by the magnetic domain A shown in FIG. 6(a), the direction of magnetization B of the magnetic functional layer 3 may be made to be hardly directed in the leftward direction from the rightward direction. By doing so, it is possible to provide the function to actively stabilize the magnetization of the recording layer 4 in the downwardly directed state. For this purpose, the magnetic functional layer 3 is allowed to have the coercive force to some extent, and thus the function is provided to contribute to the thermal stability of the magnetic domain of the recording layer thereby. This is the function of the "magnetic functional layer having the coercive force in the in-plane direction" in the present invention.

It is preferable that the axis of easy magnetization of the magnetic functional layer is in the in-plane direction and in the direction perpendicular to the recording track, i.e., in the radial direction in the case of the disk-shaped medium. In this situation, the magnetic moment of the magnetic functional layer tends to be directed in the direction perpendicular to the recording track. Therefore, the arrangement is made in the direction in which the magnetic moments of the recording layer of the mutually adjoining tracks are coupled to one another (i.e., FIGS. 6 and 7 show the cross sections in the radial direction). In this situation, when a GMR element is used for the reproducing magnetic head, the direction of the magnetic flux generated from the surface of the recording layer is the in-plane direction with respect to the thin film of the GMR element. Therefore, the magnetic flux of the recording magnetic domain is detected more effectively, and it is possible to obtain a high reproduced signal output.

As described above, in the present invention, the magnetic functional layer is added to provide the coercive force in the in-plane direction as a whole of the magnetic recording medium owing to the function thereof. It is necessary that the magnitude of the coercive force is not less than a predetermined value in order to obtain the function as described above. However, if the value is too large, then the magnetization reversal is not caused in response to the magnetization of the recording layer, and it is impossible to construct the closed magnetic path by forming the magnetization pattern as shown in FIG. 6(a) in the magnetic functional layer. In this state, the recording magnetic domain of the recording layer is rather unstable. Therefore, it is desirable that the magnetic functional layer has the coercive force of not more than such a degree that the magnetization reversal is caused by the leak magnetic field from the recording layer. An explanation will be mage below about experimental results for specifying the preferred range of the magnitude of the coercive force in the in-plane direction in relation to the magnetic recording medium according to the present invention.

It is necessary that the direction of magnetization of the magnetic functional layer is changed by the magnetic field which is generated by the residual magnetization of the recording layer. Therefore, in general, it is necessary that the coercive force in the in-plane direction of the magnetic functional layer is not more than a predetermined magnitude proportional to the residual magnetization in the perpendicular direction of the recording layer (existence of the upper limit). On the other hand, the thermal stability of the medium itself correlates with the residual magnetization in the perpendicular direction of the magnetic recording medium, for the following reason. That is, in general, the exchange coupling with respect to the adjoining magnetization is more intensified, as the magnetization of the recording layer is more increased. For this reason, any thermally unstable state may be brought about. Therefore, in order to realize the thermal stabilization, the coercive force in the in-plane direction of the medium, which results from the in-plane coercive force of the magnetic functional layer, also requires the magnitude of not less than a predetermined value corresponding to the residual magnetization in the perpendicular direction of the recording layer (existence of the lower limit). Accordingly, when the effective range of the present invention is specified, not only the coercive force in the in-plane direction but also the residual magnetization in the perpendicular direction has been measured and evaluated in a state in which the magnetic recording medium is constructed, in order to confirm the effective range of the coercive force in the in-plane direction in the state in which the magnetic recording medium is constructed.

Magnetic recording media were constructed by stacking, in several types of combinations, magnetic functional layers having coercive forces in the in-plane direction of a variety of values and recording layers formed of multi layer thin films of Co and Pd to evaluate the thermal stabilities thereof. As for the evaluating method, the recording was performed on the medium to measure the change of the normalized output of the reproduced signal depending on the elapsed time thereafter (referred to as "thermal demagnetization ratio characteristic"). In general, it has been revealed that the output is not lowered even after the elapse or passage of 1,000 seconds in the case of the magnetic recording medium which is thermally highly stable. FIG. 9 shows a graph obtained by plotting the change of the normalized output after the passage of 1,000 seconds with respect to the coercive force in the in-plane direction of each of the magnetic recording media obtained in Examples as described later on.

The inventors have succeeded in the generalization of the relationship between the coercive force Hc in the in-plane direction and the residual magnetization Mr in the perpendicular direction (of the magnetic recording medium) in the state in which the magnetic recording medium is constructed, from both of the viewpoints of the easiness of the recording and the stability of the recorded information on the basis of the experimental results shown in FIG. 9.

That is, according to the results of analysis obtained in Examples as described later on, it has been revealed that the stability can be obtained in such a degree that the change of the normalized output after the passage of 1,000 seconds is included within 1% on condition that the first magnetization stability factor Hc/Mr is within the range of the expression (2).

$$0.05 \leq Hc/Mr \leq 2.5 \tag{2}$$

Further, when the factor is within the following range:

$$0.05 \leq Hc/Mr \leq 1.2 \tag{6}$$

then the output change is within the error range, and it is scarcely changed. Therefore, this range is more preferred.

The range of the preferred magnetic characteristic (first magnetization stability factor) of the present invention has been expressed in the form of the expressions (2) and (6). However, as for the structure or arrangement in which the effect of the present invention is exhibited, it is unnecessary that the recording layer and the magnetic functional layer exist independently with any distinct boundary surface. For example, it is also possible to adopt a method in which the transition area is provided between the recording layer and the magnetic functional layer so that the magnetic characteristics of the both are continuously changed. It is also possible to provide any composition gradient in the film thickness direction so that an inclination of the magnetic characteristic is formed in the film thickness direction in the recording layer or in the magnetic functional layer itself, and it is also possible to stack the layers while changing the film formation process. When the structure as described above is provided, the coupling force of the magnetic moment of each of the layers is continuously changed in the film thickness direction in such a structure. Therefore, the arrangement of the magnetic moment depicts a smooth curve from the recording layer to the magnetic functional layer. Accordingly, the function is exhibited during the recording such that the exchange coupling force, which is exerted from the magnetic moment of the magnetic functional layer rotated by the external magnetic field in the direction thereof, efficiently rotates the magnetic moment of the recording layer. Further, during the storage of information, the effect to confine the magnetic flux is improved by the smooth arrangement of the magnetic moment as described above. Thus, it is possible to improve the thermal stability.

An actual example of construction may be exemplified by a case, for example, as in Example 2 described later on. In Example 2, multi layer thin films of Co/Pd were used for both of the recording layer and the magnetic functional layer, and the magnetic characteristics of the respective layers were adjusted by adjusting the film thicknesses of the Co layer and the Pd layer. A transition area was provided between the both layers to continuously change the stacking cycle and the film thickness of each of the Co layer and the Pd layer between the both layers. A schematic structure is shown in FIG. 3. As described later on, the stacked structure was selected so that the perpendicular magnetic anisotropy was provided at the portion corresponding to the recording layer, and the stacked structure was selected so that the in-plane magnetic anisotropy was provided at the portion corresponding to the magnetic functional layer. When the stacked structure is continuously changed between the recording layer and the magnetic functional layer, the magnetic characteristic is also continuously changed from the perpendicular magnetic anisotropy to the in-plane magnetic anisotropy. The structure has been successfully obtained, in which the magnetic moment continuously forms angles in the film thickness direction during the continuous change.

As described above, in the present invention, it is also possible to provide a structure in which the magnetic characteristic is continuously changed by using any arbitrary design element even between the both layers or within the both layers. In this case, the structure is obtained, in which the value of the residual magnetization Mr is changed in the film thickness direction. Accordingly, an explanation will be made below about the way of expression of the range of the in-plane coercive force Hc of the expression (2) when the value of Mr is changed in the film thickness direction of the magnetic recording medium as described above.

Assuming that the position in the thickness direction of the magnetic recording medium is represented by z, the value of Mr is changed depending on each of the positions z, which is represented by Mr(z). The integral thereof with respect to z is designated as M.

$$M = \int Mr(z)dz$$

The range of integration for z in this expression ranges from the lowermost portion to the uppermost portion of the stacked portion of the thin film on the substrate of the magnetic recording medium. However, the range is substantially the range of the film thickness of the recording film. That is, the integration range is substantially from z=t0 to z=t1 assuming that t0 represents the lower surface position and t1 represents the upper surface position of the recording film (t1−t0=t is given, where t represents the film thickness of the recording film). In this case, the value of M corresponds to the value of the residual magnetic moment per unit area. That is, the value of M is obtained by dividing, by the area of a sample, the value of the residual magnetic moment of the measurement sample detected by the magnetization measurement by using, for example, a vibrating sample magnetometer (VSM).

Next, the expression (2) will be transformed into a form to which the foregoing integral is applicable.

In general, the residual magnetization Mr is the residual magnetic moment per unit area. Therefore, the measured Mr is the average value of Mr(z) in the film thickness direction, and hence the following expression is given:

$$Mr = (\int Mr(z)dz)/t = M/t$$

Accordingly, the expression (2), which represents the condition of the first magnetization stability factor, is written as:

$$0.05 \leq Hc/(M/t) \leq 2.5 \tag{2A}$$

The inequality on the right side is described as:

$$t \leq 2.5 \times M/Hc \tag{2AR}$$

The inequality on the left side is described as:

$$0.05 \times M/Hc \leq t \tag{2AL}$$

The preferred range of t is expressed as follows as described later on:

$$5 \leq t \leq 60(nm)$$

If the unit is converted into (cm), the following expression is given:

$$5\times10^{-7}\leq t\leq60\times10^{-7}(cm) \quad (12)$$

Therefore, the following expression is obtained from the expression (2AR):

$$5\times10^{-7}\leq t\leq2.5\times M/Hc \quad (13)$$

Therefore, the following expression is obtained:

$$Hc\leq0.5\times10^{7}\times M$$

According to the expression (12) and the expression (2AL), the following expression is obtained:

$$0.05\times M/Hc\leq t\leq60\times10^{-7}$$

Therefore, the following expression is obtained:

$$0.8\times10^{4}\times M\leq Hc$$

According to the above, the relationship (range of the in-plane coercive force Hc) between M (residual magnetic moment value per unit area) and Hc is obtained as follows:

$$0.8\times10^{4}\times M\leq Hc\leq0.5\times10^{7}\times M$$

If this expression is transformed, the range of Hc/M is obtained as follows:

$$0.8\times10^{4}\leq Hc/M\leq0.5\times10^{7} \quad (4)$$

Hc/M represents the second magnetization stability factor in the present invention.

The expression (6), which indicates the more preferred range, is rewritten as follow:

$$0.05\leq Hc/(M/t)\leq1.2$$

The inequality on the right side can be transformed into:

$$t\leq1.2\times M/Hc$$

The inequality on the left side can be rewritten as:

$$0.05\times M/Hc\leq t$$

If the unit is converted into (cm), the preferred range of t is described as:

$$5\times10^{-7}\leq t\leq60\times10^{-7}(cm)$$

Therefore, the following expression is given:

$$5\times10^{-7}\leq t\leq1.2\times M/Hc$$

Therefore, the following expression is obtained:

$$Hc\leq0.24\times10^{7}\times M$$

Further, the following expression is obtained:

$$0.05\times M/Hc\leq t\leq60\times10^{-7}$$

Therefore, the following expression is obtained:

$$0.8\times10^{4}\times M\leq Hc$$

According to the above, the following expression is given:

$$0.8\times10^{4}\times M\leq Hc\leq0.24\times10^{7}\times M$$

That is, the following expression is obtained:

$$0.8\times10^{4}\leq Hc/M\leq0.24\times10^{7} \quad (7)$$

Thus, the more preferred range has been obtained for the expression (4) of the condition of the second magnetization stability factor.

As for the unit, the unit of (cm) is also used for the film thickness t, because the unit of ($emu/cm^3$) is used for the residual magnetization Mr. In this case, the unit of M is ($emu/cm^2$). The value of M is obtained by using a sample of the stacked magnetic recording medium. That is, the value of M is obtained by dividing, by the area ($cm^2$) of the sample, the value of the residual magnetic moment Mr×V (emu, G-$cm^3$) in the direction perpendicular to the film surface measured by the magnetization measurement such as VSM. Hc represents the coercive force in the in-plane direction of the magnetic recording medium as described above, in which the unit is (Oe). It is preferable that the direction of the coercive force is the direction perpendicular to the recording track of the in-plane direction (i.e., in the radial direction in the case of the disk-shaped medium).

As for the value of M in relation to the medium obtained by stacking a plurality of magnetic layers, the following expression holds provided that Mri represents the residual magnetization of the ith magnetic layer and ti represents the thickness thereof:

$$M=\Sigma(Mri\times ti)=Mr(z)dz$$

which is included in the category described above.

The value of M is the numerical value which principally depends on the magnetic characteristic of the recording layer. The expressions (2), (4), (6), and (7) represent the proper ranges as prescribed in view of the storage of information as described above.

Relationship Between Mr and S/N

On the other hand, another proper range of the value of M also exists in view of the requirement for the recording. The range of the value of M preferred for the recording performance, i.e., the range of the value of M, in which the effect of the present invention can be effectively exhibited, will be prescribed. In general, when the residual magnetization Mr is large, then the reproduced signal output is increased, and the noise is simultaneously increased as well. As for the increase of both of the signal and the noise, the influence of the noise is generally intense. S/N is lowered when Mr exceeds a predetermined range. FIG. 14 shows an exemplary measurement of the change of S/N with respect to Mr of the recording layer performed in Example described later on. Details of the measurement condition and the recording film will be explained in Example described later on. According to this experimental result, it has been revealed that when the residual magnetization Mr of the recording layer of the present invention satisfies the following expression (3), it is possible to obtain S/N of not less than 20 dB, which resides in the preferred range:

$$50\leq Mr\leq500(emu/cc) \quad (3)$$

As for the film thickness of the recording layer, it has been revealed from Example described later on that S/N of not less than 20 dB can be obtained with the recording layer having a film thickness of 5 nm to 60 nm, which resides in the preferred range.

The proper ranges exist for the residual magnetization Mr and the film thickness t. Therefore, the preferred range also exists for the value of M. FIG. 15 shows summarized results for the value of M concerning the recording and reproduction characteristics in relation to a variety of magnetic recording media of the present invention. The following fact has been revealed. That is, it is preferable that the value of M satisfies the following expression (5) in order to obtain S/N of not less than 20 dB. This result is in conformity with the results of Mr and t described above.

$$0.03 \times 10^{-3} \leq M \leq 3 \times 10^{-3} (emu/cm^2) \quad (5)$$

When $(Ku-2\pi Ms^2)$ is negative, the magnetic functional layer is the in-plane magnetized layer. When $(Ku-2\pi Ms^2)$ is positive, the magnetic functional layer is the perpendicular magnetized film. When $(Ku-2\pi Ms^2)$ is negative, i.e., when the magnetic functional layer is the in-plane magnetized film, it is preferable that the axis of easy magnetization is in the in-plane direction and in the direction perpendicular to the recording track. That is, it is necessary to provide such a magnetic characteristic that the coercive force of the magnetic functional layer is in the in-plane direction and in the direction perpendicular to the recording track. On the other hand, when $(Ku-2\pi Ms^2)$ is positive, i.e., when the magnetic functional layer is the perpendicular magnetized film, it is necessary to provide the coercive force when the measurement is performed in the in-plane direction. In order to realize the magnetic characteristic as described above, it is preferable that the magnetic functional layer has a dispersion or variance of perpendicular magnetic anisotropy. The method for applying the magnetic characteristic will be described later on. It is more preferable that the direction of the dispersion or variance is unevenly distributed toward the direction perpendicular to the recording track, of the respective in-plane directions. On the other hand, the recording performance and the information retention performance described above can satisfactorily function independently respectively. That is, when the expressions (1), (3), and (5) and the expressions (2), (4), (6), and (7) are satisfied as independent properties by the magnetic recording medium respectively, it is also possible to improve the recording performance and the information retention performance of the magnetic recording medium respectively.

According to the present invention, there are provided the perpendicular magnetic recording medium which is capable of recording the minute magnetic domains in the recording layer with ease and which has the excellent thermal disturbance resistance, the recording method therefor, and the magnetic recording apparatus which is provided with the magnetic recording medium.

BRIEF DESCRIPTION OF THE DRAWINGS

FIGS. 6(a) to 6(d) illustratively explain the function to improve the thermal stability by using the magnetic recording medium according to the present invention.

DESCRIPTION OF THE PREFERRED EMBODIMENTS

Figure 1:
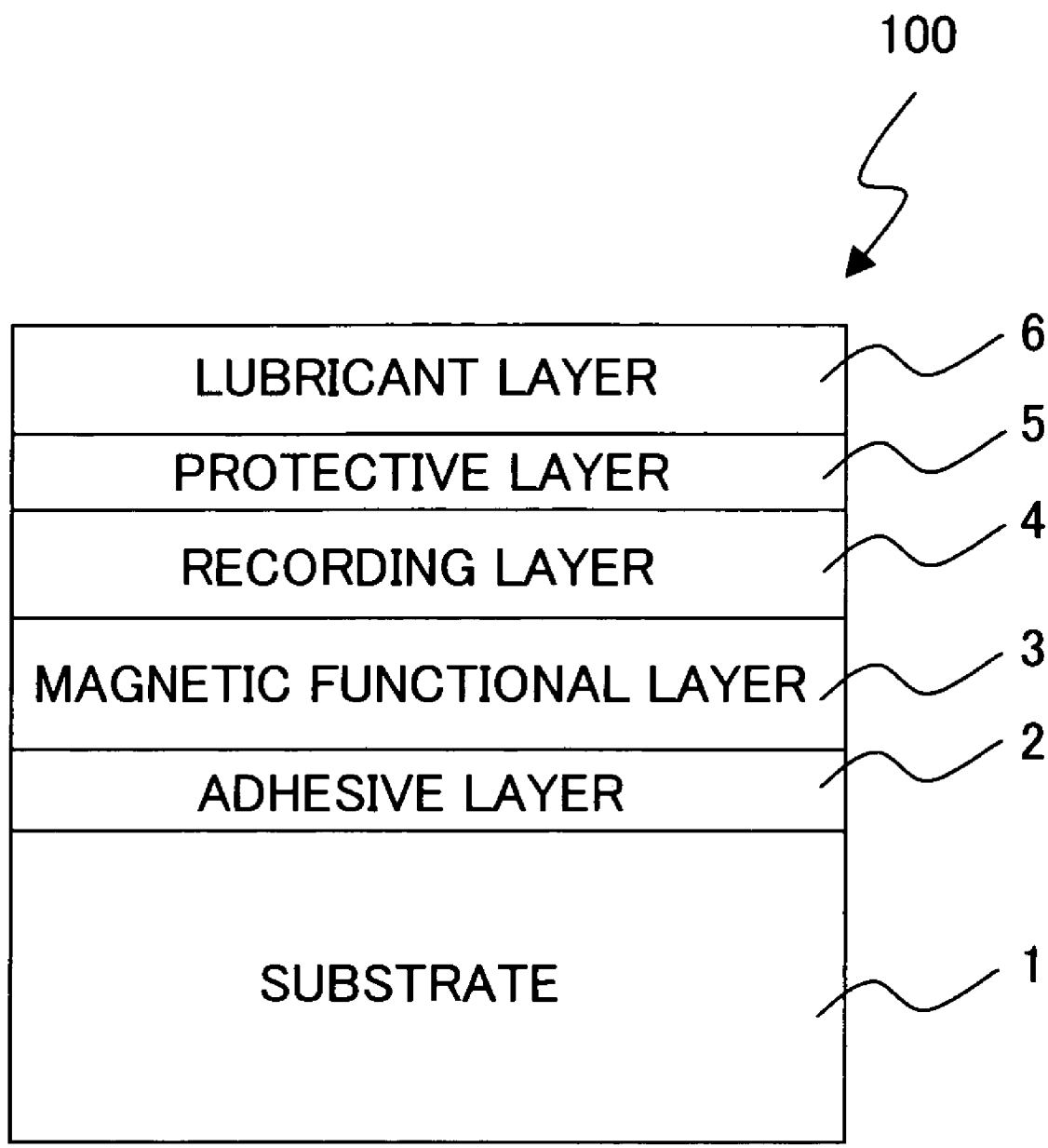
FIG. 1 shows a schematic sectional view illustrating a magnetic recording medium manufactured in Example 1 of the present invention.

A specified explanation will be made below about embodiments of the magnetic recording medium according to the present invention and the magnetic recording apparatus based on the use of the same. In the following embodiments, magnetic disks (hard disks) were manufactured as magnetic recording media. However, the present invention is also applicable to magnetic recording apparatuses and magnetic recording media of other forms including, for example, flexible disks, magnetic tapes, and magnetic cards.

In the magnetic recording medium of the present invention, a variety of perpendicular magnetized films can be used as the material for the recording layer. However, it is especially effective to use so-called multi layer thin films obtained by alternately stacking multiple layers of Co and Pd and CoCr-based polycrystalline films. When such a crystal-based recording layer is used, the exchange coupling force in the in-plane direction of the recording layer can be controlled by the crystal grain structure including, for example, the continuity in the in-plane direction and the size of the crystal grain of the recording layer as described later on. Accordingly, it is possible to obtain the synergistic effect of the performance of the successful recording of the minute magnetic domains, the assistance of the recording supported by the magnetic functional layer, and the thermal stability during the storage or preservation of information.

In this specification, the term "multi layer thin film" or "artificial lattice" means the structure obtained by mutually periodically stacking or laminating a plurality of different substances each having a thickness of a single atom or several atoms in a certain direction. The film, which has the artificial lattice structure as described above, is referred to as "multi layer thin film" or "alternately stacked multilayer film" as well. In this specification, the structure or construction of such a film is expressed, for example, as "Co/Pd".

Preferred examples of the use of the multi layer thin film for the recording layer principally reside in the use of such multi layer thin films as obtained by alternately stacking platinum family elements and transition metal elements to have thicknesses of a degree of several atoms or a single atom. For example, at least one of Pt and Pd may be used as the platinum family element. For example, Co and Fe may be used as the transition metal element. The film as described above can be formed at room temperature or at relatively low substrate temperatures, and the film has large magnetic anisotropy. Therefore, the film is most suitable for the recording layer to be used for the high density recording.

In particular, the recording layer is desirably a Co/Pd multi layer thin film obtained by alternately stacking Co layers each having a film thickness selected from a range of 0.05 nm to 0.5 nm and Pd layers each having a film thickness selected from a range of 0.5 nm to 2 nm, or a Co/Pt multi layer thin film obtained by alternately stacking Co layers each having a film thickness selected from a range of 0.05 nm to 0.5 nm and Pt layers each having a film thickness selected from a range of 0.1 nm to 2 nm. The perpendicular magnetic anisotropy is most promptly expressed by the multi layer thin film having the structure as described above.

When the recording layer is formed by using the multi layer thin layer as described above, any additional element may be contained in any one of the layers. When the additional element is contained, then the fluctuation of the composition arises, and it is possible to reduce the magnetic exchange coupling force in the in-plane direction of the recording layer. As for the additional element, it is desirable to use Si, Zr, C, or B, and it is especially preferable to use B.

In the present invention, the recording layer can be formed as a film by using an ordinary sputtering apparatus. For example, the recording layer can be also formed by juxtaposing two or more targets composed of different materials, and alternately moving a substrate carrier relative to the respective targets. Alternatively, the recording layer can be also formed by coaxially arranging at least two types of ring-shaped targets having different diameters on an identical plane, arranging a substrate so that the substrate is opposed to the targets, and alternately effecting the electric discharge for the ring-shaped targets.

A preferred range exists for the film thickness of the recording layer, for example, in view of the recording and reproduction characteristics. If the film thickness of the recording layer is thickened, then the boundary of the recording magnetic domain tends to be disturbed, and the noise is caused. Further, it is difficult to form the minute magnetic domain as well. On the other hand, if the recording layer is extremely thinned, the following problems arise. That is, the reproduced signal output is lowered, the thermal stability of the recording magnetic domain is deteriorated, and the reproduction output is lowered even at room temperature as the time elapses. When the proper range is selected for the film thickness of the recording layer, the material and the magnetic characteristic of the recording layer serve as prescribing factors. In the present invention, a variety of magnetic recording media were constructed especially by using CoCr-based polycrystalline films, Co/Pd multi layer thin films, and Co/Pt multi layer thin films to investigate the change of the S/N value depending on the film thickness. As appreciated from results of Example described later on (see FIG. 13), when the film thickness of the recording layer is 5 nm to 60 nm, S/N of not less than 20 dB is successfully obtained. It has been revealed that such a film thickness is within the preferred range. The range of the film thickness is the range of t as described later on. In view of the recording performance, it is desirable for the recording layer that the coercive force, which is measured in the direction perpendicular to the substrate surface, is 1.5 [kOe] to 10 [kOe (kilooersted)].

It is preferable to use, for example, a polycrystalline film based on CoCr as another material for constructing the recording layer of the magnetic recording medium of the present invention. Also with this material system, it is possible to control the exchange coupling force in the in-plane direction of the recording layer on the basis of the crystal grain structure including, for example, the size of the crystal grain and the continuity in the in-plane direction. The CoCr-based material may include, for example, CoCrPt, CoNiCr, and CoCrTa. However, it is especially preferable to use CoCrPt because a high coercive force is obtained.

Further, when oxygen is added, the recording layer has such a structure that the magnetic crystal grains are surrounded by oxide. Thus, the magnetic interaction between the crystal grains is reduced, and the magnetic recording medium having low noise is provided. In this case, it is preferable that the oxygen content in the recording film is 5 to 20 at. %. If the oxygen content is less than 5 at. %, then the magnetic grains are insufficiently separated from each other, and the medium noise is insufficiently reduced as well. If the oxygen content is more than 20 at. %, oxygen is incorporated into the magnetic crystal grains. As a result, the S/N ratio is lowered due to the deterioration of the magnetic characteristics. When the oxygen content is not less than 5 at. %, then the magnetic grains are promptly separated from each other, and it is possible to reduce the medium noise. Further, when the oxygen content is not more than 20 at. %, then oxygen is not incorporated into the magnetic crystal grains, and it is possible to obtain a satisfactory S/N ratio.

The CoPtCr alloy magnetic film containing oxygen can be formed by the sputtering with a CoPtCr alloy containing oxygen as a target material. Oxygen can be also introduced into the CoPtCr alloy magnetic film by using a mixed gas of argon-oxygen as the sputtering gas and appropriately regulating the mixing ratio thereof.

Further, it is preferable that Si or Mg is contained by 3 to 15 at. % in the CoPtCr alloy magnetic film containing oxygen. When Si or Mg is mixed at the content of 3 to 15 at. % in the CoPtCr alloy magnetic film containing oxygen, it is possible to improve the coercive force of the magnetic recording medium and realize the low noise.

The method for mixing Si or Mg in the CoPtCr alloy magnetic film containing oxygen includes a method in which the sputtering is performed with a target in which $SiO_2$ or MgO is mixed at a ratio of several % to several tens % in a CoPtCr target. In this method, it is possible to adjust not only the content of Si or Mg but also the content of oxygen. The formed CoCrPt alloy magnetic film has a structure in which $SiO_2$ or MgO exists around the magnetic crystal grains of Co.

In order to direct the direction of the axis of easy magnetization of the recording layer as the CoPtCr alloy magnetic film in the direction perpendicular to the film surface so that the recording layer serves as the so-called perpendicular magnetized film, it is also possible to provide an under layer which controls the crystalline orientation. For example, an alloy film mainly composed of CoCrRu can be used as the under layer. The crystalline structure possessed by the CoCrRu film is the same hcp structure as that of the recording layer. Therefore, when the oriented film is used as the under layer, the c-axis, which is the axis of easy magnetization of the recording layer, can be subjected to the crystalline orientation in the direction perpendicular to the in-plane direction.

It is noted that CoCrRu also has the function to control the magnetic coupling state between the recording layer and the magnetic functional layer in addition to the function to control the crystalline orientation of the recording layer. For example, when the coercive force of the magnetic functional layer is relatively large (for example, in the case of Example 3 described later on), the exchange coupling is preferred as the magnetic coupling between the magnetic functional layer and the recording layer. In this exemplary embodiment, the exchange coupling can be expressed principally when the CoCrRu film has the magnetism, or when the magnetism of the CoCrRu film is induced by the contact with the recording layer or the magnetic functional layer. As for the condition based on the composition ratio of the CoCrRu film, it has been revealed to be satisfactory that Cr is not more than 50 atomic % in the composition ratio of Co to Cr. As for the film thickness, the effect as described above can be exhibited when the film thickness is not more than 50 nm. On the other hand, if the film thickness is thinner than 5 nm, the crystalline orientation of the recording layer is deteriorated. Further, if the film thickness is thicker than 20 nm, the following factors of other problems arise. That is, the crystal grains of the second under layer become coarse, the medium noise is increased, and the recording characteristics are deteriorated. Therefore, it is preferable that the film thickness of the second under layer is 5 to 20 nm. When the recording layer and the magnetic functional layer are subjected to the exchange coupling in the form as described above, it is possible to obtain the function and the effect of the present invention more appropriately.

In the present invention, the "magnetic functional layer having the coercive force in the in-plane direction" is constructed by using a pseudo-soft magnetic material so that the coercive force in the in-plane direction, which is obtained in the state of the construction of the magnetic recording medium, is within the range represented by the expression (2) and preferably the expression (6) (or the expression (4) and preferably the expression (7)). The material, which is usable for the magnetic functional layer, may be firstly composed of an alloy containing at least one noble metal selected from Pt, Pd, Rh, Au, Ag, and Cu and at least one transition metal selected from Fe, Co, and Ni. In particular, it is appropriate to use an alloy layer containing Pt or Pd and Co or Fe.

The alloy film as described above has the pseudo-soft magnetic characteristic such that the axis of easy magnetization is in the in-plane direction and the coercive force is provided in the in-plane direction. For example, in the case of the PtCo alloy, the magnetic characteristics such as the coercive force can be controlled by using the film formation or deposition condition and the composition ratio of Pt and Co. According to an experiment performed in Example as described later on, it has been revealed that the coercive force can be adjusted to be about 10 to 600 Oe when the composition ratio of the PtCo alloy ranges over Co 10 to 70 atomic % and 85 to 100 atomic %. The preferred range of the residual magnetization Mr is calculated back to 200 to 500 (emu/cc) according to the expression (6) with the coercive forces within the range as described above.

With the PtCo alloy described above, it is also possible to provide an under layer in order to add the magnetic anisotropy in the in-plane direction. The under layer serves to add the magnetic anisotropy in the in-plane direction by allowing the magnetic functional layer to grow epitaxially with respect to the under layer. In view of the crystal lattice match, it is possible to use materials of, for example, Mo and W and/or Cr alloys such as CrV and CrTi and Cr.

The multi layer thin film is preferred as a second material for constructing the magnetic functional layer. For example, it is possible to use multi layer thin films such as Co/Pd and Co/Pt obtained by alternately stacking layers containing at least Co each having a film thickness selected within a range of 0.8 nm to 3.0 nm and layers containing at least one platinum family element of Pt and Pd each having a film thickness selected within a range of 1.0 nm to 10.0 nm. In general, predetermined magnetic characteristics can be obtained for the multi layer thin film by adjusting the stacking cycle, the thickness of the platinum family element layer, and/or the thickness of the Co layer. However, when the stacked structure as described above is used, the multilayer thin film serves as the magnetic functional layer.

Those preferably usable as a third material for constructing the magnetic functional layer also include, for example, a magnetic film having a microcrystalline structure obtained by uniformly dispersing, in Fe, a nitride or a carbide of at least one element selected from Ta, Nb, and Zr, for example, FeTaC. It is also allowable to use an amorphous alloy principally composed of CoZr and containing at least one element selected from Ta, Nb, and Ti. As for specified materials, it is possible to use, for example, CoNbZr and CoTaZr having high magnetic permeability.

Those usable as other materials for constructing the magnetic functional layer include, for example, NiFe, ErFeCo, GdFeCo, Co, Fe, TmFeCo, and CoCr-based polycrystalline films. It is also preferable to use, as the material for the magnetic functional layer, substances having high magnetic permeability in the direction perpendicular to the film surface.

Oxygen can be further added to the polycrystalline film based on CoCr as described above. For example, the coercive force in the in-plane direction of the CoCrPt film can be controlled by adding oxygen. In the case of in-plane magnetized films (magnetic functional layers) having compositions of Example 3 described later on, the film, to which oxygen is not added, has a coercive force of about 2.1 (kOe), while the coercive force in the in-plane direction is lowered as the amount of addition of oxygen is increased when oxygen is added. In the case of the in-plane magnetized film based on CoCrPt as described above, the coercive force is generally lowered by the addition of oxygen. The film is non-magnetic when the amount of addition of oxygen exceeds 40 atomic %. Therefore, the magnetic characteristics, which are obtained when the magnetic recording medium is constructed by controlling the coercive force in the in-plane direction by adding oxygen within a range of not more than 40 atomic %, can be adjusted so that the expression (2) and preferably the expression (6) or the expression (4) and preferably the expression (7) are satisfied.

Even when any one of the materials is used, the composition ratio and the stacked structure are controlled in order to provide the function of the magnetic functional layer. That is, the material is used while making the adjustment so that the perpendicular magnetic anisotropy constant Ku of the magnetic functional layer as the magnetic characteristic satisfies the expression (1) and/or the coercive force in the in-plane direction, which is obtained when the magnetic recording medium is constructed, satisfies the expression (2) and preferably the expression (6) or the expression (4) and preferably the expression (7). The method for controlling the coercive force is preferably a method in which oxygen or nitrogen is added in a minute amount to the material used for the magnetic functional layer as described above to make the adjustment.

When a minute amount of oxygen or nitrogen is added to the system as described and exemplified as the material for the magnetic functional layer, a state is given, in which a phase of oxide or nitride of the metal exists in a mixed manner in the alloy phase. The point of the oxide phase or the nitride phase behaves as a pinning point upon the displacement of the domain wall in the in-plane direction or upon the rotation of the magnetization, which results in a factor to generate the coercive force. Therefore, the magnitude of the coercive force can be controlled by using the degree of the addition of oxygen and/or nitrogen.

The amount of addition of oxygen or nitrogen, which is adopted in order to obtain the proper coercive force, is as follows. At first, for the purpose of generating the proper coercive force, oxygen or nitrogen is added by not less than 0.1 atomic %. Further, when oxygen and/or nitrogen is added by not more than 30 atomic %, then the exchange coupling is intensified between the magnetic functional layer and the recording layer, and the effect to stabilize the magnetization, which is the object of the present invention, is sufficiently obtained. Therefore, it is preferable that oxygen and nitrogen are added by not less than 0.1 atomic % and not more than 30 atomic % in total. It has been revealed that this range is generally effective for the materials for the magnetic functional layer as described above. The magnetic characteristics can be adjusted by adding oxygen or nitrogen within the concentration range as described above in each of the systems to make the adjustment individually so that Ku satisfies the expression (1) and/or the coercive force in the in-plane direction, which is obtained when the magnetic recording medium is constructed, has the predetermined value to satisfy the expression (2) and preferably the expression (6) or the expression (4) and preferably the expression (7). In general, it is suitable that the film thickness of the magnetic functional layer is adjusted within a range of 20 to 150 nm in order to obtain the preferable characteristics.

In relation to the method for producing the magnetic functional layer, a mixed gas of argon and oxygen is used as the sputtering gas, and the ratio between argon and oxygen is appropriately regulated. Accordingly, oxygen can be introduced in a dispersed state into the in-plane magnetic layer.

When a multi layer thin film is used for the recording layer, and a multi layer thin film, which is based on the same material system, is also used for the magnetic functional layer, then the stacked structure is obtained, in which the thickness and the stacking cycle of each of the layers are different between the recording layer and the magnetic functional layer. The magnetic functional layer has the axis of easy magnetization in the in-plane direction, and it is possible to adjust, for example, the coercive force in the in-plane direction. The stacked structure is controlled so that the recording layer, which is stacked on the magnetic functional layer, is formed as the perpendicular magnetized film which has the axis of easy magnetization in the direction perpendicular to the film surface and which has the coercive force of 1.5 kOe to 10 kOe in the perpendicular direction. The overall adjustment is made so that, for example, the coercive force in the in-plane direction and the residual magnetization in the perpendicular direction, which are obtained when the magnetic recording medium is constructed, satisfy the expression (2) and preferably the expression (6) or the expression (4) and preferably the expression (7).

Figure 3:
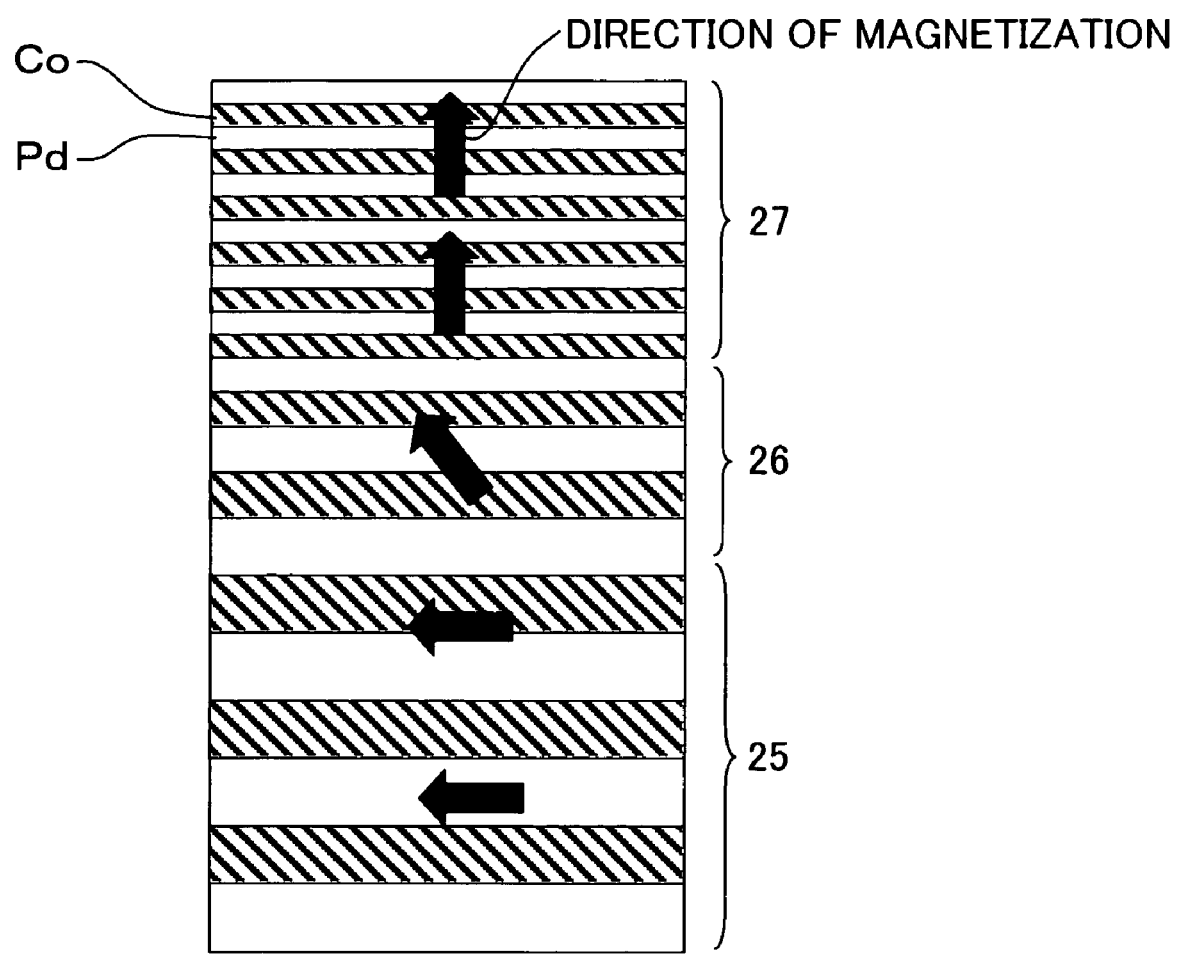
FIG. 3 shows a cross section of a part of the magnetic recording medium manufactured in Example 2.

When the multi layer thin films are used for both of the recording layer and the magnetic functional layer, it is possible to improve, for example, the magnetic flux-confining performance by continuously changing, for example, the stacking cycle and the film thickness of each of the layers by using the transition area provided between the recording layer and the magnetic functional layer as shown in FIG. 3. Thus, it is possible to obtain the effect to further improve the thermal stability.

Figure 11:
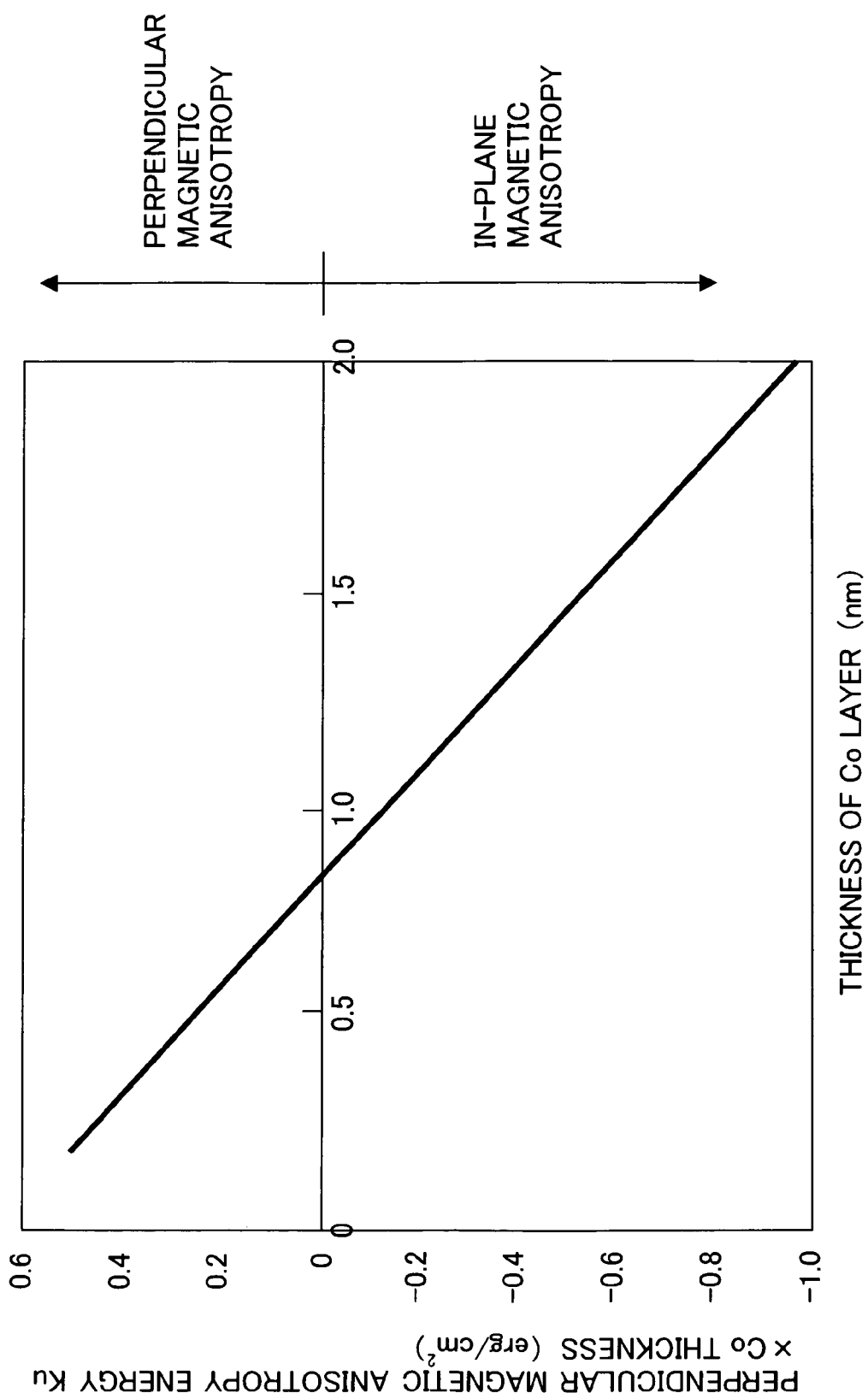
FIG. 11 shows the change of the magnetic anisotropy with respect to the film thickness of Co in a Co/Pd multi layer thin film.

FIG. 11 shows an example of the measurement of the change of the magnetic anisotropy with respect to the Co film thickness of the Co/Pd multi layer thin film as performed in Example described later on. As shown in FIG. 11, the multi layer thin film generally exhibits the perpendicular magnetic anisotropy in a region in which the Co layer is thin. Therefore, it is preferable to make the control so that the proper magnetic characteristics are obtained respectively by using the multi layer thin film in which the Co layer is not more than 0.8 nm as a fundamental material for the structure of the recording layer and using the multi layer thin film in which the Co layer is thicker than the above within a range of not less than 0.8 nm as a fundamental material for the structure of the magnetic functional layer.

In view of the necessity for other magnetic characteristics, it is preferable to use, as the magnetic functional layer in the present invention, for example, a multi layer thin film of Co/Pd or Co/Pt formed by alternately stacking layers containing at least Co each having a film thickness selected within a range of 0.8 nm to 3.0 nm, and layers containing at least one platinum family element of Pt and Pd each having a film thickness selected within a range of 1.0 nm to 10.0 nm.

The magnetic characteristics can be also adjusted by appropriately adding different elements to the magnetic functional layer and the recording layer respectively. When the multi layer thin film, which resides in the same system as that of the recording layer, is used for the magnetic functional layer as described above, then the effect of the seed layer stacked under the magnetic functional layer, i.e., the effect to control and properly adjust the crystalline orientation and the grain diameter is brought about for the both layers, and it is possible to realize the satisfactory state in view of the recording performance.

As for the material for the seed layer, it is possible to use, for example, the Pd element and at least one element selected from the group consisting of Si, B, C, and Zr. In particular, it is preferable to construct the seed layer by using Pd and Si or Pd and B. It is desirable that the film thickness is within a range of 1 nm to 30 nm.

In the present invention, it is also preferable that a soft magnetic under layer is provided under the magnetic functional layer. The soft magnetic under layer functions as follows. That is, when the recording is performed on the perpendicular magnetic recording medium by using a single magnetic pole head, then the magnetic flux, which is emitted from a main magnetic pole of the recording magnetic head, is allowed to pass through the soft magnetic under layer in the in-plane direction after passing through the recording layer, and the magnetic flux is refluxed to an auxiliary magnetic pole of the recording magnetic head to form a closed magnetic field loop. Accordingly, the loss of the magnetic flux reflux can be reduced, and the intense magnetic field can be efficiently applied to the recording layer. Thus, the recording characteristic is improved. The soft magnetic under layer does not generates the coercive force in the in-plane direction and the residual magnetization in the perpendicular direction. Therefore, no influence is exerted on the measurement in relation to the expressions (2), (6), (4), and (7) which indicate the ranges of the effect of the present invention. Thus, the evaluation can be made in a state in which the soft magnetic under layer is stacked. When the soft magnetic under layer is allowed to have the magnetic characteristics of the magnetic functional layer of the present invention, it is possible to exhibit the same or equivalent effect as that of the magnetic functional layer described above.

Those usable for the substrate of the magnetic recording medium of the present invention include, for example, non-magnetic substrates such as aluminum-magnesium alloy substrates, glass substrates, and graphite substrates. The surface of the aluminum-magnesium alloy substrate may be plated with nickel-phosphorus. The substrate surface may be processed or treated to be flat by allowing diamond abrasive grains or abrasive tape to forcibly abut against the substrate surface while rotating the substrate.

An adhesive layer, which is composed of, for example, Ti, Si, or Cr, may be formed on the substrate in order to improve the adhesion performance between the substrate and the magnetic thin film stacked thereon.

A protective layer may be provided on the recording layer. Those preferably usable as the protective layer include, for example, any one of amorphous carbon, silicon-containing amorphous carbon, nitrogen-containing amorphous carbon, boron-containing amorphous carbon, silicon oxide, zirconium oxide, and cubic system boron nitride.

A lubricant may be applied onto the protective layer in order to obtain satisfactory characteristics of sliding movement resistance. A perfluoropolyether-based polymer lubricant, which has a principal chain structure composed of three elements of carbon, fluorine, and oxygen, is used as the lubricant. Alternatively, a fluorine-substituted alkyl compound can be also used as the lubricant. It is also allowable to use other organic lubricants and inorganic lubricants provided that the material provides stable sliding movement and durability. It is preferable that the thickness of the lubricant layer is 0.5 nm to 3 nm in average value.

EXAMPLE 1

FIG. 1 shows a schematic cross section of a magnetic recording medium 100. The magnetic recording medium 100 has an adhesive layer 2, a magnetic functional layer 3, a recording layer 4, a protective layer 5, and a lubricant layer 6 which are provided in this order on a substrate 1. An oxygen-added PtCo alloy was used for the magnetic functional layer 3, and a Co/Pd multi layer thin film was used for the recording layer 4. The perpendicular magnetic recording medium 100 having the stacked structure as described above was principally formed by means of the magnetron sputtering method. The arrival vacuum degree during the sputtering was set to high vacuum as compared with $5 \times 10^{-6}$ Pa for each of the layers. Ar gas, Kr gas, or mixed gas based on these gases, which had a purity of not less than 6 N, was principally used for the sputtering gas. The substrate temperature during the film formation or deposition was room temperature. An explanation will be made below about the method for producing each of the layers.

Adhesive Layer

At first, the glass substrate 1 having a diameter of 65 mm was prepared. A film of Ti was formed as the adhesive layer 2 to have a thickness of 5 nm on the glass substrate 1 by using a continuous sputtering apparatus.

Magnetic Functional Layer

Subsequently, a PtCo alloy film added with oxygen was formed as the magnetic functional layer 3 on the adhesive layer 2.

In this example, the magnetic functional layer 3 composed of the oxygen-added PtCo alloy was formed by the so-called co-sputtering method in which two targets of Pt and Co were simultaneously subjected to the electric discharge. The film was formed by introducing Ar containing 1.5% oxygen at a partial pressure ratio as the sputtering gas to add oxygen into the film. As a result, the oxygen-added PtCo alloy, which had an atomic composition ratio of Pt:Co:O=63:35:2, was obtained. The film thickness was 50 nm. When the magnetic functional layer 3 was formed, a magnetic field of about 50 to 150 Oe was radially applied in the radial direction of the substrate of the medium. Accordingly, the magnetic functional layer 3 is successfully formed as the magnetic film having the axis of easy magnetization in the direction perpendicular to the recording track of the in-plane direction, i.e., in the radial direction of the medium.

Recording Layer

The recording layer 4, which had the artificial lattice structure of Co and Pd, was formed on the magnetic functional layer 3. When the recording layer 4 was formed, the film was formed by the sputtering while alternately opening/closing shutters for a Co target and a Pd target in Ar gas. Accordingly, the recording layer 4 having the artificial lattice structure, in which the Co layers and the Pd layers were alternately stacked, was formed. One layer of the Co layers had a thickness of 0.11 nm, and one layer of the Pd layers had a thickness of 0.92 nm. As for the numbers of the stacked Pd layers and the stacked Co layers, 26 Pd layers were stacked, and 25 Co layers were stacked.

Protective Layer

Subsequently, the protective layer 5 composed of amorphous carbon was formed to have a thickness of 3 nm on the recording layer 4 by the DC magnetron sputtering method.

Lubricant Layer

Subsequently, a perfluoropolyether-based lubricant layer was formed as the lubricant layer 6 to have a thickness of 1 nm on the protective layer 5 by the dipping method. Thus, the magnetic recording medium 100 having the stacked structure as shown in FIG. 1 was manufactured.

Figure 7:
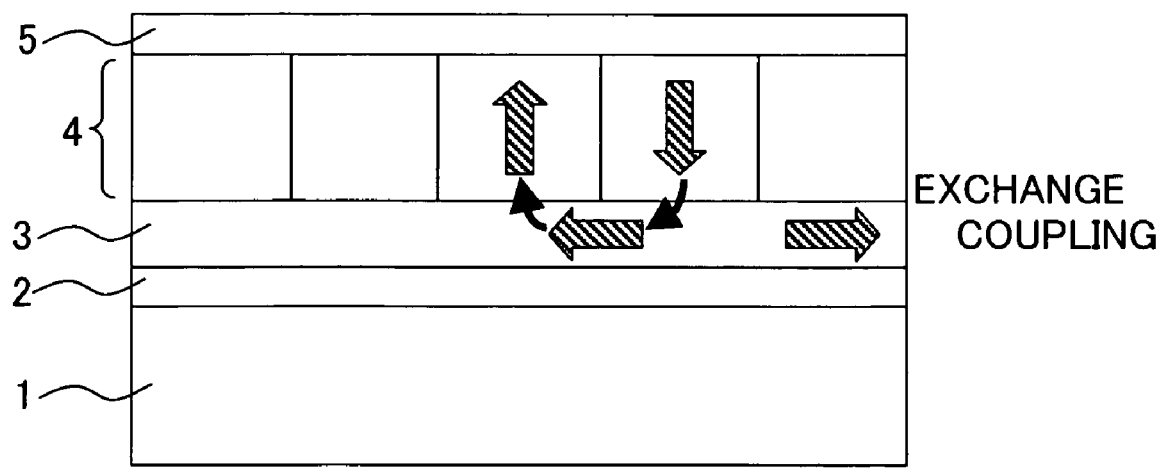
FIG. 7 illustratively shows a schematic cross section of a typical stacked or laminated structure of the magnetic recording medium according to the present invention.

When the stacked structure, in which the recording layer 4 and the magnetic functional layer 3 make direct contact with each other, is formed as in Example 1, the exchange coupling force is exerted between the both. This situation is illustratively shown in FIG. 7. After the recording is performed, the magnetic moment on the surface of the magnetic functional layer 3 is aligned with the magnetization direction of the recording layer 4 owing to the exchange coupling function. Further, the magnetic moment is aligned along with the magnetic fluxes generated from the magnetization of the recording layer 4. A micro closed magnetic path, which connects the magnetic domains of the recording layer 4, is formed in the magnetic functional layer 3. In the case of the magnetic structure as described above, the magnetic flux, which is generated from the magnetic pole on the surface of the recording layer 4, is effectively detected by the reproducing magnetic head. Therefore, it is possible to realize the high output.

Relationship Between Mr and Hc

The following experiment was performed in order to investigate the preferred relationship between the coercive force Hc in the in-plane direction of the magnetic functional layer and the residual magnetization Mr in the perpendicular direction of the recording layer. The stacked structures and the composition ratios of the recording layer and the magnetic functional layer described in each of Examples were controlled to manufacture a variety of magnetic recording media having various combinations of Mr and Hc in order to evaluate the thermal stability. When the magnetic recording medium of Example 1 was produced, then the film thickness of the Co layer was changed in the multiple film structure of the Pd layers and the Co layers for constructing the recording layer, and thus the value of the residual magnetization Mr of the recording layer was adjusted. The composition ratio and the amount of oxygen addition of the PtCo alloy added with oxygen were changed, and thus the adjustment was made so that the magnetic functional layers had a variety of coercive forces Hc in the in-plane direction. The Co composition ratio was adjusted in the recording layer of the CoCr-based polycrystalline film to control the residual magnetization Mr. The process parameters such as the sputtering gas pressure during the sputtering were adjusted for the magnetic functional layer based on the use of the Pd/Co multi layer thin film to control the coercive force Hc in the in-plane direction. Thus, the magnetic recording media were prepared, in which the magnetic functional layers having the various coercive forces Hc in the in-plane direction were combined with the recording layers having the various residual magnetizations Mr to evaluate the thermal stabilities thereof. Mr's of the manufactured media were 50, 210, 330, 420, and 500 (emu/cc). The following evaluation method was adopted. That is, the recording was performed on the medium to measure the change of the normalized output of the reproduced signal depending on the passage of time thereafter (referred to as "thermal demagnetization ratio characteristic"). The measurement environment was at 70° C., and the measurement was performed under the severer condition. In general, in the case of the magnetic recording medium having high thermal stability, the output is not lowered even after the passage of 1,000 seconds. The measurement was performed by using an apparatus and a method described later on in Example 5.

Figure 9:
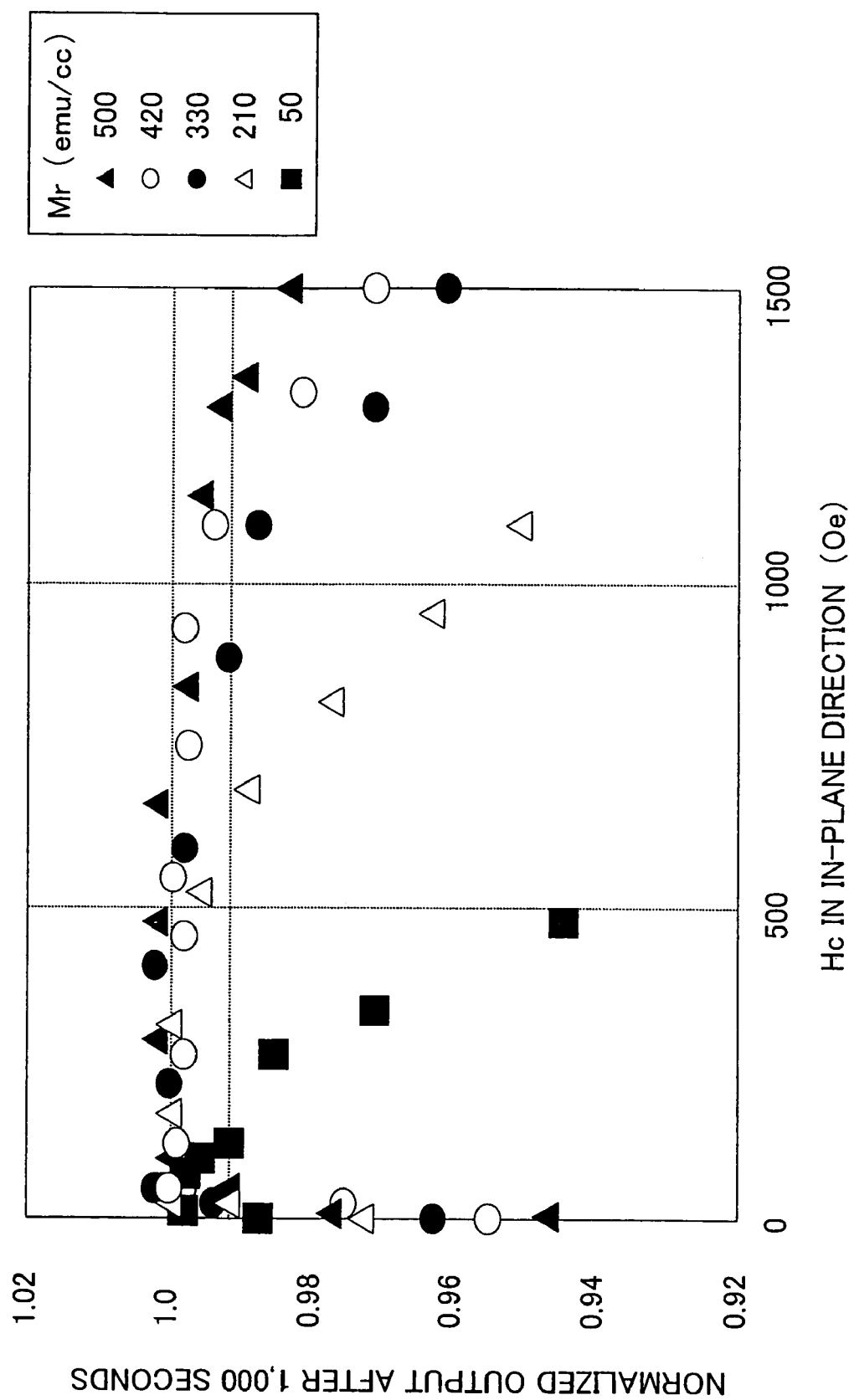
FIG. 9 shows results of the measurement of the thermal demagnetization ratio in the case of the change of the coercive force of the magnetic functional layer to be used for the magnetic recording medium according to the present invention.
Figure 16:
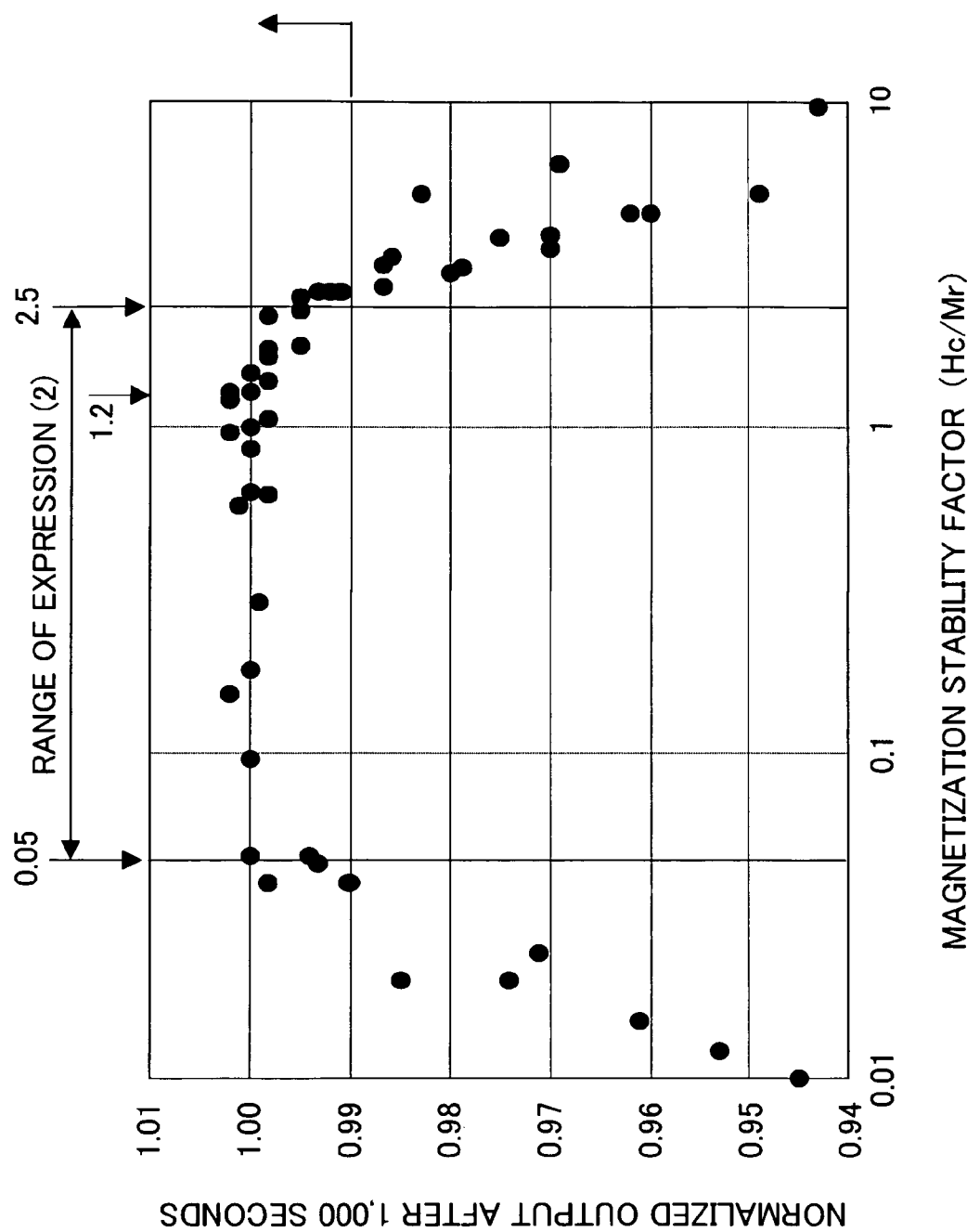
FIG. 16 shows a graph illustrating the change of the normalized output after the passage of 1,000 seconds with respect to the magnetization stability factor Hc/Mr of the magnetic recording medium according to the present invention.

FIG. 9 shows a graph obtained by plotting the change of the normalized output after the passage of 1,000 seconds with respect to the coercive force in the in-plane direction of each of the magnetic recording media. FIG. 16 shows a graph obtained by plotting the data again on the basis of the first magnetization stability factor Hc/Mr. This verification was performed for many magnetic recording media having the various magnetic characteristics (Mr=50, 210, 330, 420, 500). According to this graph, it is appreciated that a series of tendency is indicated by the data on the graph. That is, the stability of the recording magnetization depends on the magnetization stability factor Hc/Mr found out by the inventors. The recording magnetization can be retained extremely stably by adjusting the magnetization stability factor Hc/Mr to be within the limited range. Specifically, the graph indicates the fact that the (first) magnetization stability factor Hc/Mr, with which the change of the normalized output after the passage of 1,000 seconds is included within 1%, resides in $0.05 \leq Hc/Mr \leq 2.5$. According to the result shown in FIG. 16, it is appreciated that the thermal stability is high in the case of the medium which has a large value of the magnetization stability factor Hc/Mr to some extent, as compared with the medium in which the magnetization stability factor Hc/Mr is extremely small. Further, it is appreciated that the thermal stability is deteriorated again on the side on which the magnetization stability factor Hc/Mr is high, for the following reason. That is, the magnetic functional layer cannot effect the magnetization reversal in the direction of magnetization of the recording magnetic domain during the recording, because the coercive force of the magnetic functional layer is too large. As a result, it is impossible to form any closed magnetic path required for the stabilization of the magnetization. If the closed magnetic path is not formed, the action is reversely exerted in the direction to displace or move the recording magnetic domain. Therefore, the thermal stability is consequently deteriorated. Further, in this state, it is also impossible to record any magnetic domain having a predetermined size as the recording magnetic domain when the recording is performed. Therefore, S/N is inferior as compared with other cases as well.

Figure 10:
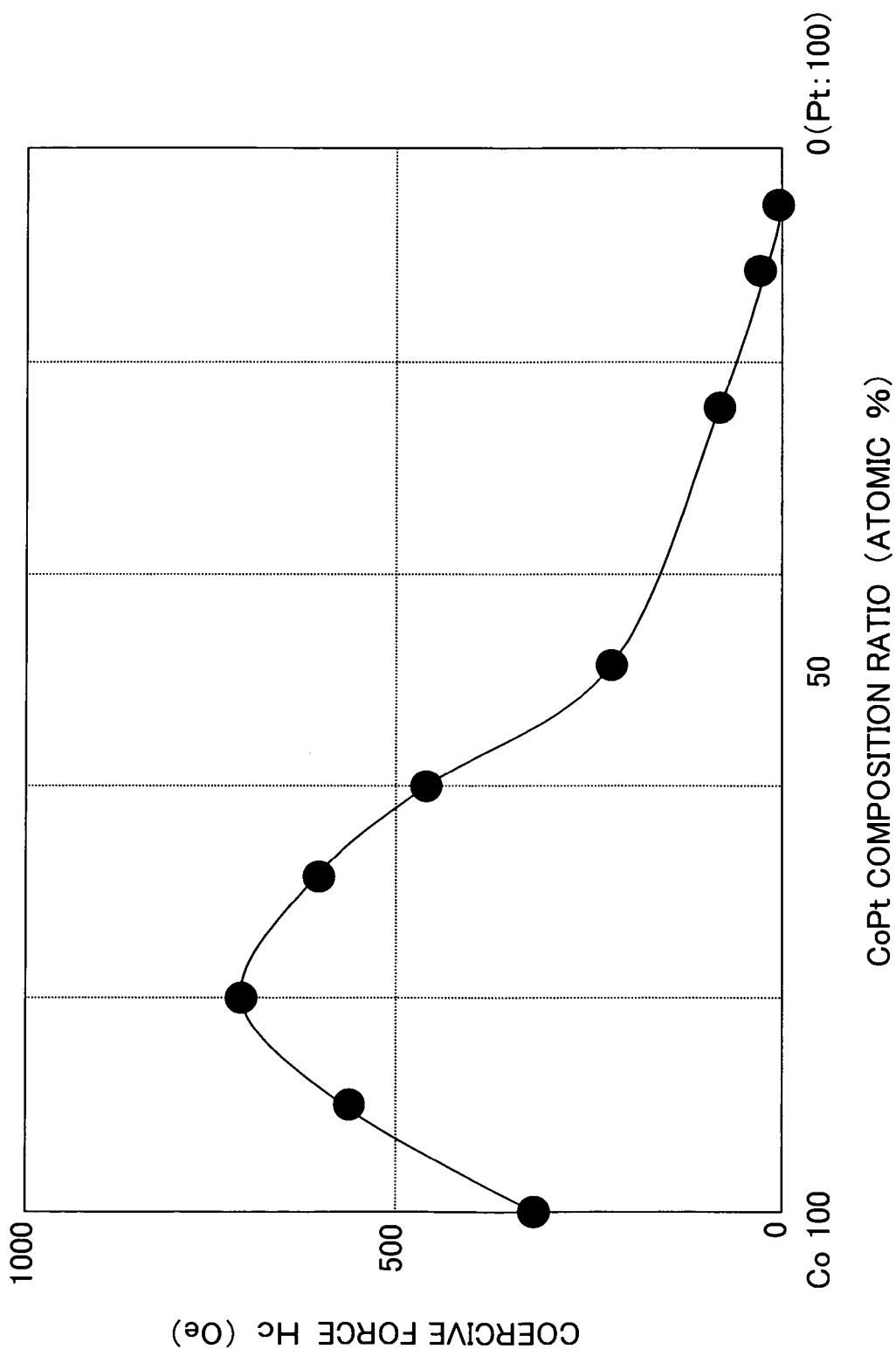
FIG. 10 shows the change of the in-plane coercive force with respect to the composition ratio of a PtCo alloy thin film.

Relationship Between Composition and Coercive Force of Magnetic Functional Layer The investigation was made about the way of the change of the coercive force (Hc) in the in-plane direction when the composition of the PtCo alloy thin film of the magnetic functional layer was variously changed in relation to the medium of Example 1. FIG. 10 shows the change of the coercive force (Hc) in the in-plane direction of the PtCo alloy thin film depending on the composition ratio. According to this result, when the composition ratio of the PtCo alloy ranges over Co 10 to 70 atomic % and 85 to 100 atomic %, the coercive force is about 10 to 600 Oe. The preferred range of the residual magnetization Mr is calculated back to 200 to 500 (emu/cc) in accordance with the expression (6) with the coercive forces Hc within the range as described above. Basically, in the present invention, the magnetic characteristics of the recording layer and the magnetic functional layer are set in accordance with the expression (2) and preferably the expression (6) or the expression (4) and preferably the expression (7). However, in the case of the perpendicular magnetic recording medium, the typical value of the residual magnetization Mr of the recording layer is within the range of 200 to 500 (emu/cc). When the materials as described above are used, it is possible to easily adjust the coercive force Hc to be within the preferred range of about 10 to 600 Oe. Therefore, it is appreciated that such a procedure is especially suitable for the magnetic functional layer of the present invention.

EXAMPLE 2

Figure 2:
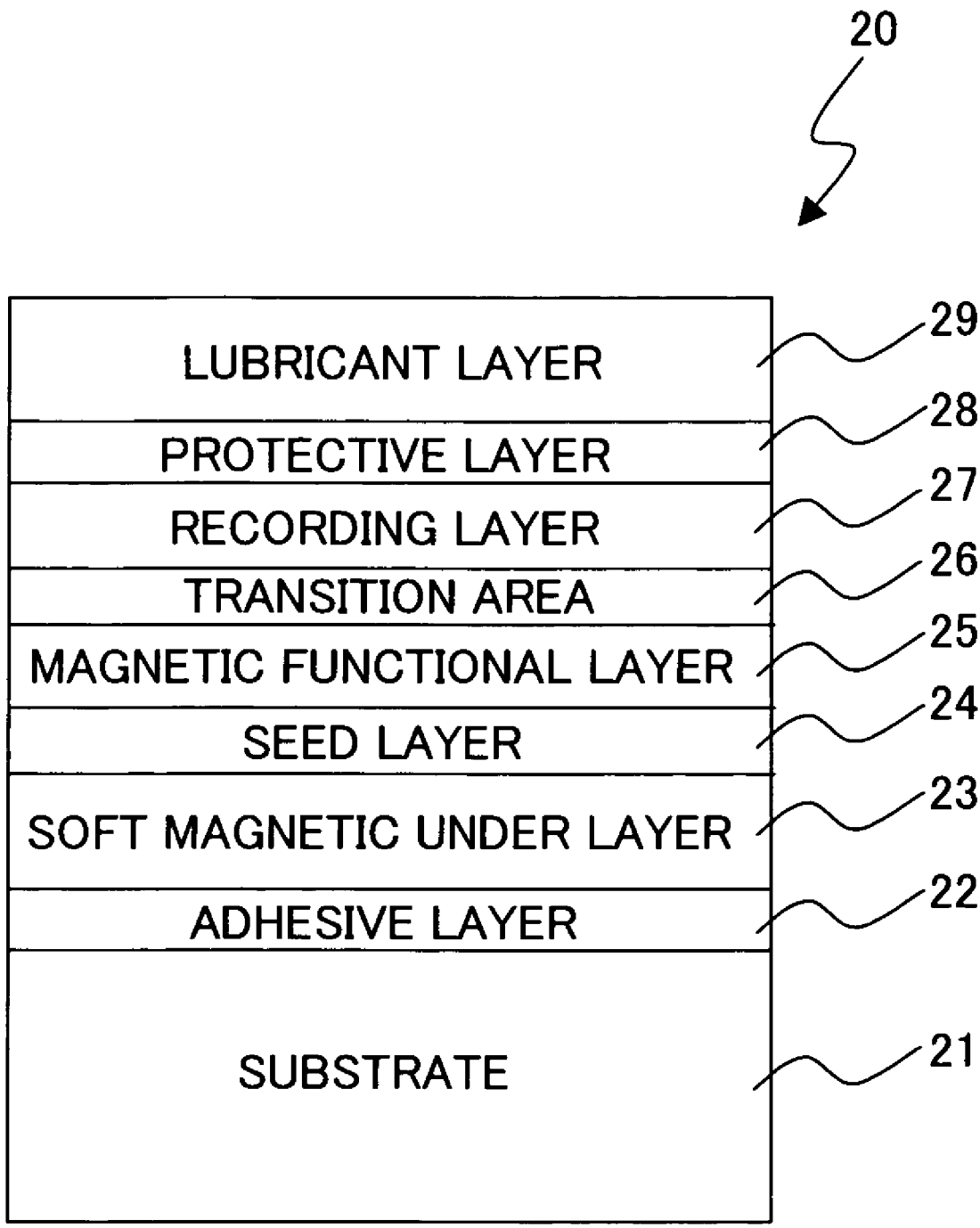
FIG. 2 shows a schematic sectional view illustrating a magnetic recording medium manufactured in Example 2 of the present invention.

Next, an embodiment of the magnetic recording medium is shown, in which multi layer thin films of Co and Pd were used for both of a recording layer and a magnetic functional layer. FIG. 2 shows a schematic sectional view illustrating the magnetic recording medium 20.

Adhesive Layer

An adhesive layer 22 was formed on a glass substrate 21 in the same manner as in Example 1.

Soft Magnetic Under Layer

Subsequently, a soft magnetic under layer 23 was stacked on the adhesive layer 22. $Fe_{79}Ta_9C_{12}$ was used as a material, and the film was formed to have a thickness of 200 nm. Further, $Fe_{79}Ta_9C_{12}$, which was formed as the film, was heated for 30 seconds at a temperature of 450° C. by using a carbon heater in vacuum, followed by being gradually cooled.

Seed Layer

Subsequently, a seed layer 24 was formed as a layer to optimally control the crystalline orientation of the recording layer 27. In this example, $Pd_{60}B_{40}$ was formed to have a thickness of 5 nm as the seed layer 24 on the soft magnetic under layer 23. The film was formed by means of the co-sputtering method by introducing argon gas into a sputtering chamber, applying a DC electric power to a Pd target, and applying an RF electric power to a B target.

Magnetic Functional Layer

The magnetic functional layer 25, which was composed of the multi layer thin film, was formed as follows. That is, the film was formed by means of the sputtering while alternately opening/closing shutters by using a Co target and a Pd target to alternately stack Co layers and Pd layers. Ar was introduced as the sputtering gas, and the pressure was 4 mTorr. In order to allow the multi layer thin film of this system to be an in-plane magnetized film, the sputtering gas pressure of Ar is preferably not more than 5 mTorr. One layer of the Co layers had a thickness of 1.2 nm, and one layer of the Pd layers had a thickness of 5.7 nm. As for the numbers of the stacked layers, 11 Pd layers were stacked, and 10 Co layers were stacked. During the film formation of the magnetic functional layer 25, a magnetic field of about 50 to 150 Oe was radially applied in the radial direction of the substrate of the medium in the same manner as in Example 1 so that the direction of the axis of easy magnetization of the magnetic functional layer 25 was directed in the in-plane direction and in the direction perpendicular to the recording track (radial direction of the medium).

Recording Layer

In Example 2, the recording layer 27 composed of the multi layer thin film was formed in accordance with the same method as used in Example 1. The recording layer 27 had the artificial lattice structure comprising Co layers and Pd layers which were alternately stacked. One layer of the Co layers had a thickness of 0.11 nm, and one layer of the Pd layers had a thickness of 0.92 nm. As for the numbers of the stacked Pd layers and the stacked Co layers, 26 Pd layers were stacked, and 25 Co layers were stacked.

In Example 2, a transition area 26 was provided between the recording layer 27 and the magnetic functional layer 25. The stacked structure between the recording layer 27 and the magnetic functional layer 25 was continuously changed by providing the transition area 26. As shown in FIG. 3, the transition area 26 has a structure in which Co/Pd was stacked in five cycles. The thicknesses of the Co layers and the Pd layers of the transition area are continuously changed such that the thicknesses approach the thicknesses of the Co layers and the Pd layers of the recording layer 27 from the thicknesses of the Co layers and the Pd layers of the magnetic functional layer 25. Accordingly, the recording layer 27 and the magnetic functional layer 25 are connected to one another via the transition area 26 in which the film thickness is linearly changed.

A protective layer 28 and a lubricant layer 29 (see FIG. 2), which were formed on the recording layer 27, were constructed, for example, in accordance with the same production process and with the same materials as those used in Example 1.

Relationship Between Magnetic Anisotropy and Thickness of Co in Co/Pd Multi Layer Thin Film The thickness of Co of the Co/Pd multi layer thin film manufactured in Example 2 was changed to have various values in order to investigate the change of the perpendicular magnetic anisotropy energy. In this case, the thicknesses of the Pd layers were 0.8 nm, 1.6 nm, 3.2 nm, and 6.4 nm respectively. The respective Pd layers were manufactured in combination with the Co layers having the respective thicknesses. FIG. 11 shows a result of the measurement of the change of the magnetic anisotropy with respect to the Co thickness of the Co/Pd multi layer thin film. As shown in FIG. 11, the perpendicular magnetic anisotropy is exhibited in an area in which the Co layer is thin. It has been also revealed that the perpendicular magnetic anisotropy energy basically does not depend on the thickness of the Pd layer, and the perpendicular magnetic anisotropy energy approximately exists on the straight line shown in the graph of FIG. 11.

EXAMPLE 3

Figure 4:
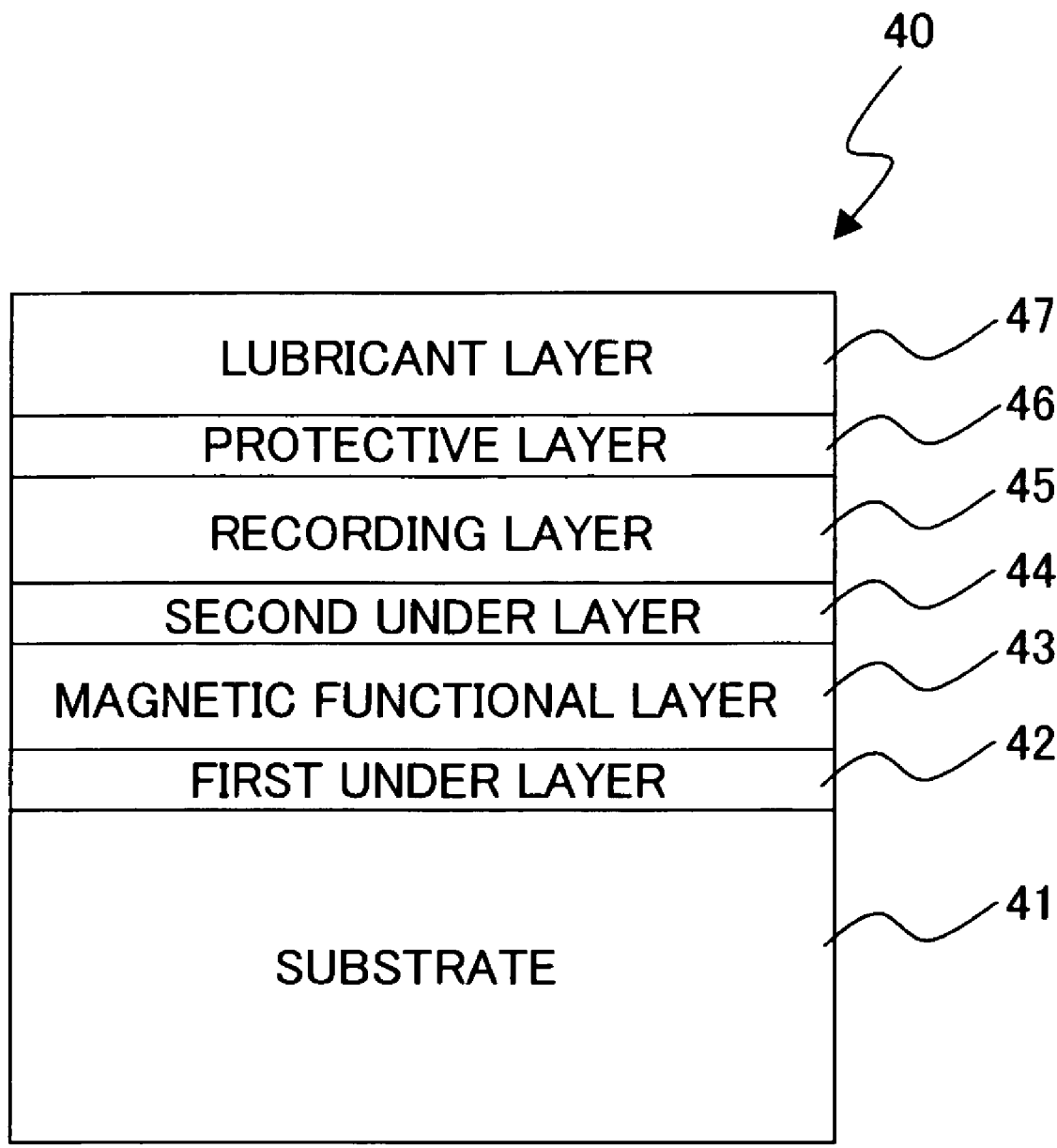
FIG. 4 shows a schematic sectional view illustrating a magnetic recording medium manufactured in Example 3 of the present invention.
Figure 5:
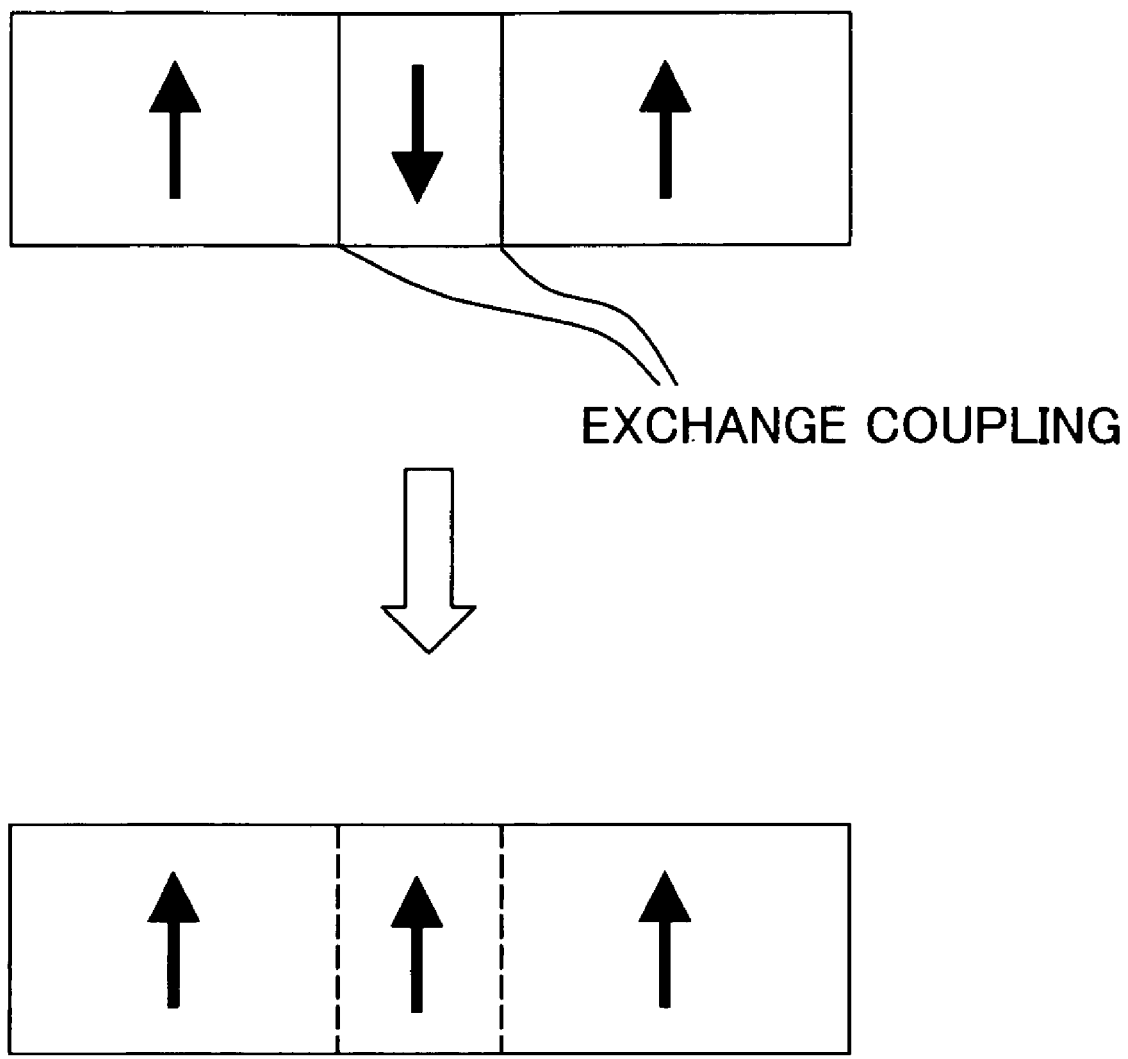
FIG. 5 schematically explains the factor of the thermal instability of the perpendicular magnetic recording film.

Still another different embodiment of the present invention will be explained with reference to FIG. 4. FIG. 4 shows a schematic sectional view of a magnetic recording medium manufactured in Example 3. As shown in FIG. 4, the magnetic recording medium 40 has a structure comprising a first under layer 42, a magnetic functional layer 43, a second under layer 44, a recording layer 45, a protective layer 46, and a lubricant layer 47 which are successively stacked on a substrate 41. CoCr-based polycrystalline films, specifically CoCrPt films added with oxygen were used for both of the magnetic functional layer 43 and the recording layer 45. The magnetic functional layer 43 has the axis of easy magnetization in the in-plane direction, and the recording layer 45 has the axis of easy magnetization in the direction perpendicular to the film surface. The directions of the axes of easy magnetization of the magnetic functional layer 43 and the recording layer 45 were controlled by controlling the crystalline orientations of the magnetic functional layer 43 and the recording layer 45 by using the first under layer 42 and the second under layer 44 respectively. The substrate 41, the protective layer 46, and the lubricant layer 47 were formed in the same manner as in the embodiment described above.

First Under Layer

The disk-shaped glass substrate 41 having a diameter of 65 mm was used, and Cr was stacked as the first under layer 42 to have a thickness of 10 nm thereon.

Magnetic Functional Layer

In this example, a CoCrPt film added with oxygen was used as the magnetic functional layer 43 composed of the CoCr-based material. The coercive force in the in-plane direction of the CoCrPt film can be controlled by adding oxygen. For example, in the case of an in-plane magnetic layer (magnetic functional layer) added with no oxygen, the coercive force in the in-plane direction is about 2.1 (kOe). On the other hand, in the case of an in-plane magnetic layer (magnetic functional layer) added with oxygen, the coercive force in the in-plane direction is lowered as the amount of addition of oxygen is increased.

In this example, the magnetic functional layer 43 of CoCrPt—O was formed on the first under layer 42 by using $Co_{74}Cr_{14}Pt_{12}$ as a sputtering target by using a DC magnetron sputtering apparatus. During the film formation, a mixed gas of argon and oxygen was used as the sputtering gas, and the total pressure of the mixed gas was regulated to be 10 mTorr. As for oxygen, a predetermined amount of oxygen can be added into the magnetic layer by appropriately regulating the partial pressure of oxygen within a pressure range of 0 to $15\times10^{-5}$ Torr. In this example, the film was formed while the partial pressure of oxygen was $4.5\times10^{-5}$ Torr. The in-plane magnetic layer (magnetic functional layer) 43 composed of CoCrPt—O, which contained oxygen by about 22 atomic % in the film, was obtained. The film thickness was 30 nm. During the film formation of the magnetic functional layer 43, a magnetic field of about 50 to 150 Oe was radially applied in the radial direction of the substrate of the medium so that the direction of the axis of easy magnetization of the magnetic functional layer 43 was in the in-plane direction and in the direction perpendicular to the recording track (radial direction of the medium).

Second Under Layer

In the magnetic recording medium of this example, an alloy film mainly composed of CoCrRu was used as the second under layer 44 in order to control the crystalline orientation of the recording layer 45 as the oxygen-containing CoPtCr alloy magnetic film.

The target composition was $Co_{60}Cr_{20}Ru_{20}$ (at. %). As for the sputtering condition, the gas pressure was 3.0 Pa, and the input electric power was 500 W. The thickness of the second under layer 44 was 10 nm.

Recording Layer

In the magnetic recording medium of this example, the oxygen-containing CoPtCr alloy magnetic film was used as the recording layer 45.

In this example, the oxygen-containing CoPtCr alloy magnetic film was formed as the recording layer 45 on the second under layer 44 by the RF sputtering. As for the sputtering condition, the argon gas pressure was 3.0 Pa, and the input electric power was 500 W. The target composition was $Co_{66}Pt_{20}Cr_{14}$ (at. %)-O (CoPtCr:O=91:9 mol %). The thickness of the recording layer 45 was 20 nm.

Protective Layer and Lubricant Layer

The protective layer 46 of a C (carbon) film was formed on the recording layer 45 by means of the DC sputtering in the same manner as in the embodiment described above. A lubricant was applied onto the protective layer 46 to form the lubricant layer 47. The magnetic recording medium 40 thus obtained was installed into the magnetic recording apparatus to evaluate the recording and reproduction characteristics in the same manner as in the embodiment described above.

The residual magnetization Mr in the direction perpendicular to the substrate surface, the coercive force HcO in the direction perpendicular to the recording track in the in-plane direction of the substrate, the coercive force Hcl in the direction perpendicular to the substrate surface, and the residual magnetic moment M per unit area in the direction perpendicular to the substrate surface were measured for each of the magnetic recording media produced in Examples 1 to 3 as described above. Obtained results are shown in Table 1.

tion of the respective layers including, for example, the recording layer and the magnetic functional layer are not limited to those of the foregoing embodiments. The present invention can be carried out by appropriately adjusting the magnetic characteristics so that the expression (2) and preferably the expression (6) or the expression (4) and preferably the expression (7) are satisfied in the state in which the selection is arbitrarily made to construct the magnetic recording medium.

EXAMPLE 4

A magnetic recording medium was manufactured in the same manner as in Example 1 except that a magnetic functional layer was composed of a Co/Pt multi layer thin film comprising Co layers and Pt layers which were alternately stacked, one layer of the Co layers had a thickness of 0.4 nm, one layer of the Pt layers had a thickness of 1.1 nm, and the numbers of the stacked Pt layers and the stacked Co layers were such that 15 Pt layers were stacked and 15 Co layers were stacked.

Comparative Example 1

A magnetic recording medium was manufactured in the same manner as in Example 2 except that the magnetic functional layer and the transition area were not provided unlike Example 2.

Comparative Example 2

A magnetic recording medium was manufactured in the same manner as in Example 1 except that a magnetic functional layer was composed of a Co/Pd multi layer thin film, one layer of Co layers had a thickness of 1.5 nm, one layer of Pd layers had a thickness of 5.7 nm, and the numbers of the stacked layers of the Pd layers and the Co layers were 9 layers for the Pd layers and 9 layers for the Co layers unlike Example 1.

Comparative Example 3

A magnetic recording medium was manufactured in the same manner as in Example 1 except that a magnetic functional layer was composed of a Co/Pt multi layer thin

TABLE 1

| | Mr (emu/cc) | Hcl (kOe) | HcO (Oe) | Expression (2)<br>Expression (6) | M (×10⁻³ emu/cm²) | Expression (4)<br>Expression (7) |
|---|---|---|---|---|---|---|
| Ex. 1 | about 420 | about 3.6 | 80 | $21 \leq Hc \leq 1050$<br>$21 \leq Hc \leq 504$ | 1.13 | $9.0 \leq Hc \leq 5650$<br>$9.0 \leq Hc \leq 2712$ |
| Ex. 2 | about 440 | about 3.2 | 140 | $22 \leq Hc \leq 1100$<br>$22 \leq Hc \leq 528$ | 1.17 | $9.4 \leq Hc \leq 5850$<br>$9.4 \leq Hc \leq 2808$ |
| Ex. 3 | about 450 | about 4.4 | 930 | $22.5 \leq Hc \leq 1125$<br>$22.5 \leq Hc \leq 540$ | 0.90 | $7.2 \leq Hc \leq 4500$<br>$7.2 \leq Hc \leq 2160$ |

It is appreciated that the magnetic recording media of Example 1 and Example 2 satisfy the expressions (2), (6), (4), and (7), and the magnetic recording medium of Example 3 satisfies the expressions (2), (4), and (7).

The illustrative embodiments of the magnetic recording medium according to the present invention have been described above. However, the structures and the combinafilm, one layer of Co layers had a thickness of 0.4 nm, one layer of Pt layers had a thickness of 0.6 nm, and the numbers of the stacked layers of the Pt layers and the Co layers were 65 layers for the Pt layers and 65 layers for the Co layers unlike Example 1.

Magnetic characteristics and recording and reproduction characteristics (S/N values) of the magnetic recording media manufactured in Examples 1 to 4 and Comparative Examples 1 to 3 are shown in Table 2.

TABLE 2

| | Ms (emu/cc) | t (nm) | $2\pi Ms^2$ ($10^6$ erg/cc) | Ku ($10^6$ erg/cc) | $Ku/2\pi Ms^2$ | S/N (dB) |
|---|---|---|---|---|---|---|
| Example 1 | 440 | 50 | 1.216 | 1.1 | 0.9047481 | 26.3 |
| Example 2 | 220 | 75 | 0.304 | −1.2 | −3.947992 | 25.7 |
| Example 3 | 450 | 30 | 1.272 | −2.5 | −1.965872 | 25.3 |
| Example 4 | 250 | 22.5 | 0.393 | 2.3 | 5.8598726 | 22.4 |
| Comp. Ex. 2 | 240 | 65 | 0.362 | −1.8 | −4.976115 | 18.5 |
| Comp. Ex. 3 | 210 | 65 | 0.277 | 1.7 | 6.1383364 | 19.2 |
| Comp. Ex. 1 | — | — | — | — | — | 19.4 |

According to the result described above, the range of the magnetic anisotropy energy Ku has been summarized with the specified numerical values. It is successfully confirmed that any one of the media, in which the magnetic characteristic is adjusted to satisfy the relationship of:

$$-4 \times 2\pi Ms^2 \leq Ku \leq 6 \times 2\pi Ms^2 \quad (1)$$

when the range of Ku with the S/N value being within the range exceeding 20 dB is represented with $2\pi Ms^2$ as the demagnetizing magnetic field energy according to the experimental result shown in Table 2, exhibits the satisfactory recording and reproduction characteristic of not less than 20 dB.

Relationship Between Mr of Recording Layer and S/N

Figure 14:
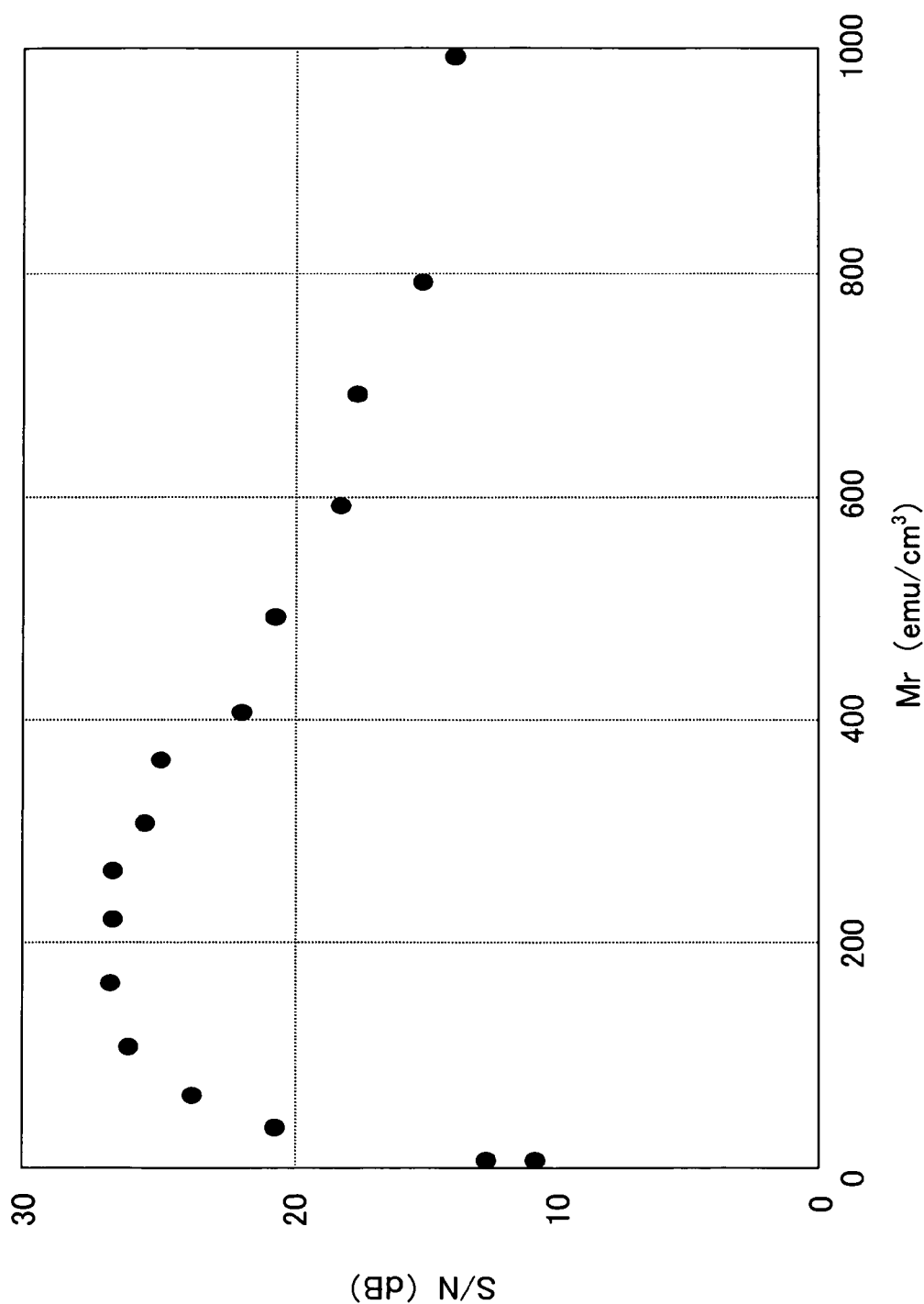
FIG. 14 shows a graph illustrating the change of S/N with respect to Mr of the recording layer.
Figure 15:
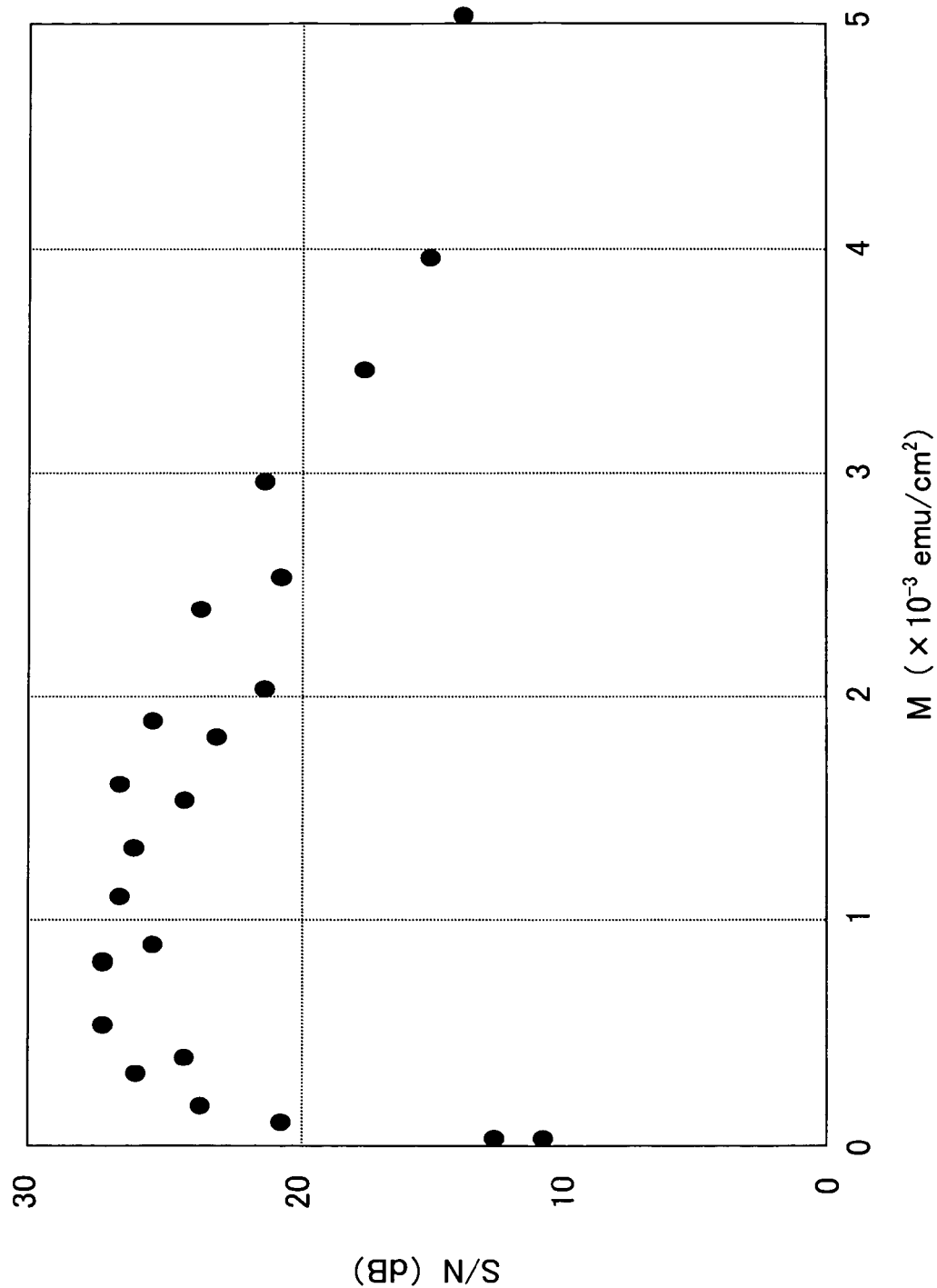
FIG. 15 shows a graph illustrating the change of S/N with respect to the value of M of the recording layer.

The respective magnetic recording media produced in Examples as described above were used to investigate the relationship between S/N and the residual magnetization Mr preferred for the recording. When the residual magnetization Mr was adjusted, the composition ratio of the recording layer and the film formation condition were controlled. The thickness of the Co layer was principally changed for the recording layer of the Pd/Co multi layer thin film. The composition ratio of Co was changed for the recording layer composed of the CoCr-based polycrystalline film. Obtained results are shown in FIG. 14. S/N was measured under the same condition as that used in Example 5 described later on. As a result, it is appreciated that the S/N value exhibits approximately the same change with respect to the recording layer composed of each of the materials. Further, it is appreciated that S/N of not less than 20 dB can be obtained when the residual magnetization Mr of the recording layer satisfies $50 \leq Mr \leq 500$ (emu/cc).

Relationship Between Mr of Recording Layer and Thickness

Figure 13:
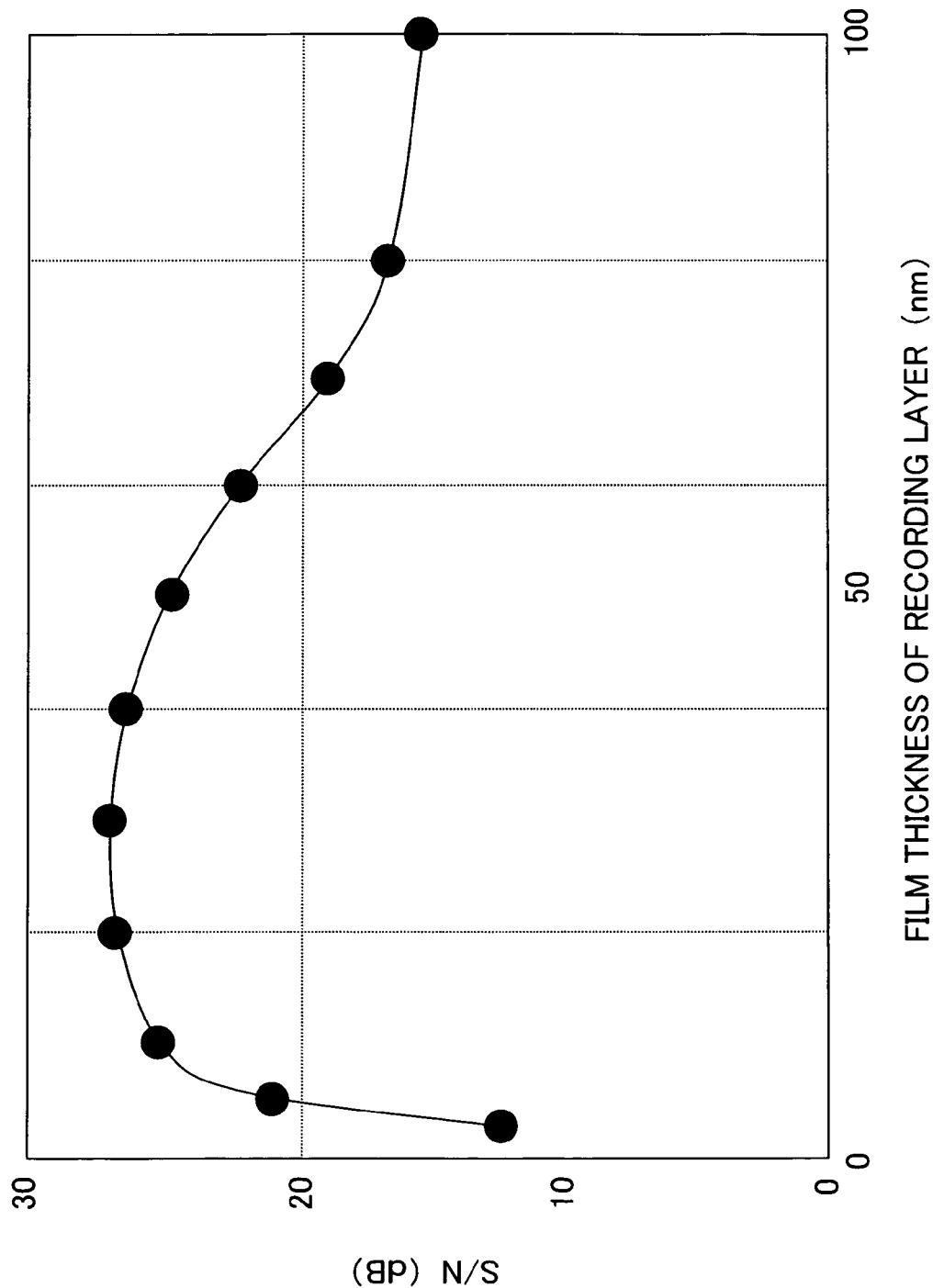
FIG. 13 shows a graph illustrating the change of S/N with respect to the film thickness of the recording layer.

As for the preferred range of the thickness of the recording layer, the magnetic recording media produced in Examples as described above were used to investigate the relationship with respect to S/N as well. The Pd/Co multi layer thin film and the CoCr-based polycrystalline film were used as the recording layers, and the media were manufactured while changing the thicknesses respectively. S/N was investigated under the same measuring condition as that used in Example 5 described later on. As a result, the following fact has been revealed. That is, the S/N value exhibits approximately the same change with respect to the recording layer composed of each of the materials. As shown in FIG. 13, S/N of not less than 20 dB can be obtained with the recording layer having the thickness of 5 nm to 60 nm.

Magnetic Recording Apparatus

A magnetic recording apparatus according to the present invention will be explained below.

The magnetic recording apparatus of the present invention is provided with the magnetic recording medium as described above. Therefore, the magnetic recording apparatus is capable of recording information at a high surface recording density, and the magnetic recording apparatus has an ability to retain information with excellent thermal stability.

In the magnetic recording apparatus of the present invention, a magnetic head may comprise a recording magnetic head for recording information on the magnetic recording medium and a reproducing magnetic head for reproducing information recorded on the magnetic recording medium. It is desirable that the gap length of the recording magnetic head is 0.2 μm to 0.02 μm. If the gap length exceeds 0.2 μm, it is difficult to perform the recording at a high linear recording density of not less than 400 kFCI.

The reproducing magnetic head can be constructed by using a magneto-resistance effect element. It is desirable that the reproducing shield spacing of the reproducing magnetic head is 0.2 μm to 0.02 μm. The reproducing shield spacing directly relates to the reproducing resolution. As the reproducing shield spacing is shorter, the resolution becomes higher. It is desirable that the lower limit of the reproducing shield spacing is appropriately selected within the foregoing range depending on, for example, the stability of the element, the reliability, the electric resistance characteristic, and the output.

In the magnetic recording apparatus of the present invention, the drive unit can be constructed by using a spindle for driving and rotating the magnetic recording medium. It is desirable that the speed of rotation of the spindle is 3,000 revolutions to 20,000 revolutions per minute. If the speed of rotation is slower than 3,000 revolutions per minute, the data transfer speed is lowered, which is not preferred. On the other hand, if the speed of rotation exceeds 20,000 revolutions per minute, the noise and the heat generation of the spindle are increased, which is not desirable. In view of the speed of rotation as described above, the optimum relative velocity between the magnetic recording medium and the magnetic head is 2 m/second to 30 m/second.

EXAMPLE 5

Figure 12:
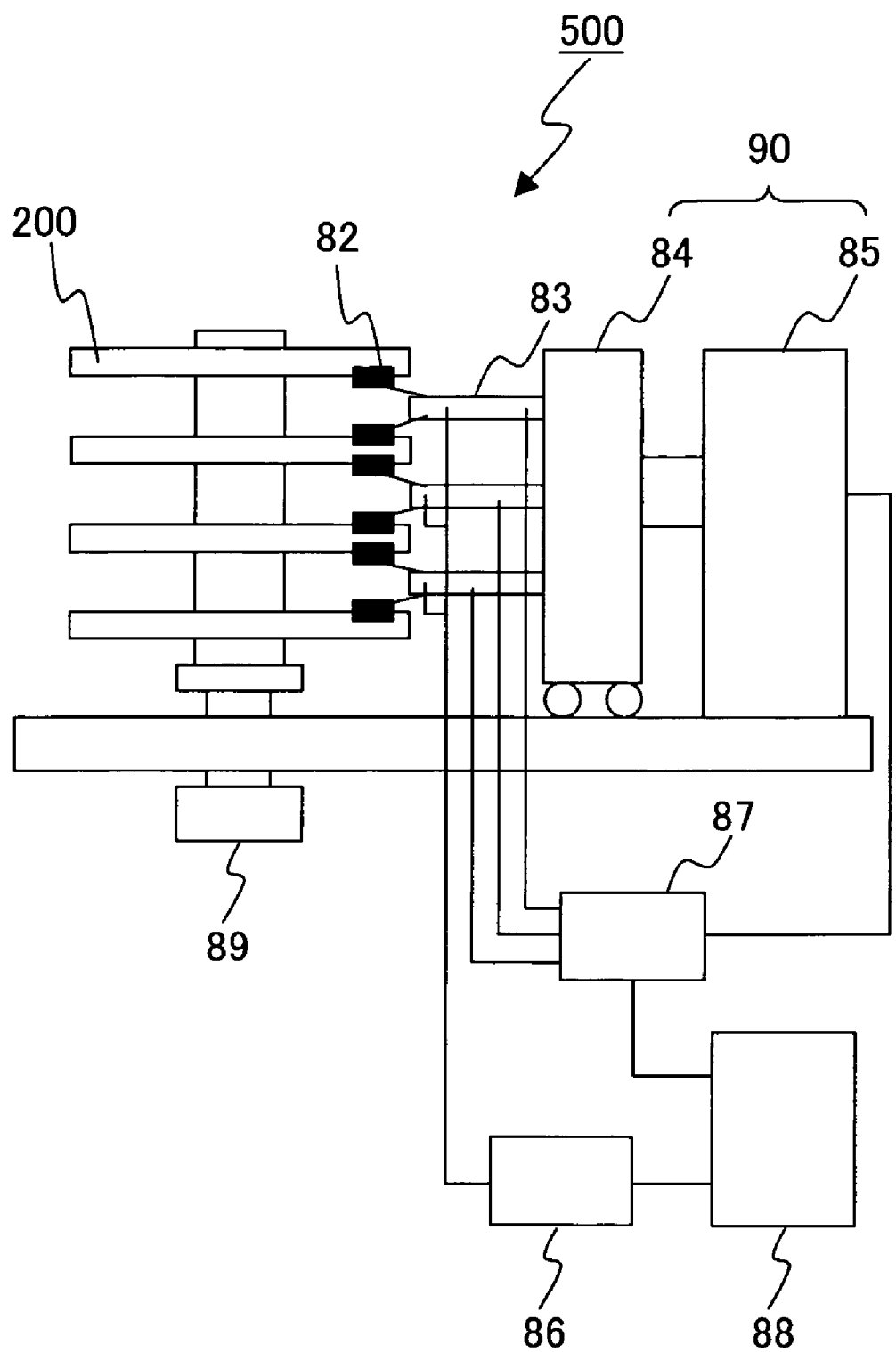
FIG. 12 shows a schematic arrangement of a magnetic recording apparatus according to the present invention.

A plurality of magnetic recording media were manufactured in accordance with the steps of producing each of the magnetic recording media as described above. As shown in FIG. 12, the magnetic recording media 200 were incorporated into a magnetic recording apparatus 500. In this example, four types of the magnetic recording apparatuses 500, which adopted the magnetic recording media according to Examples 1 to 4 described above as the magnetic recording media 200 respectively, were manufactured.

The magnetic recording apparatus 500 comprises the magnetic recording media 200, a rotary drive unit 89 for driving and rotating the magnetic recording media 200, magnetic heads 82, a head drive unit 90 for moving the magnetic heads 82 to desired positions over the magnetic recording media, and a recording and reproducing circuit 86. The head drive unit 90 comprises an actuator 84 and a driving circuit 85. The magnetic recording apparatus 500 further comprises, for example, suspensions 83, the recording and reproducing circuit 86, a positioning circuit 87, and an interface control circuit 88.

The magnetic head 82 is a magnetic head in which a recording magnetic head (not shown) and a reproducing magnetic head (not shown) are integrated into one unit. The recording head is a thin film magnetic head having a single magnetic pole type writing element based on the use of a soft magnetic layer having a high saturation magnetic flux density of 2.1 T. The reproducing magnetic head is a GMR (Giant Magneto-Resistive) magnetic head of the dual spin-valve type having the giant magnetoresistance effect.

The integrated type magnetic head 82 is held by the suspension 83. The suspension 83 is controlled by the magnetic head drive unit 90 composed of the actuator 84 and the driving circuit 85. The suspension 83 and the driving circuit 85 are connected to the positioning circuit 87 respectively. The positioning circuit 87 is connected to the interface control circuit 88. The interface control circuit 88 is connected to the recording and reproducing circuit 86. The recording and reproducing circuit 86 is connected to the magnetic head 82 via the suspension 83.

The single magnetic pole type writing element of the magnetic head 82 is capable of recording information on the magnetic recording medium by applying the magnetic field depending on the data to be recorded on the magnetic recording medium during the recording of information. The GMR reading element of the magnetic head 82 is capable of reproducing information recorded on the magnetic recording medium by detecting the change of the leak magnetic field from the magnetic recording medium. The recording and reproducing circuit 86 is capable of sending the recording signal to the single magnetic pole type writing element of the magnetic head 82 by encoding the data to be recorded on the magnetic recording medium 200. The recording and reproducing circuit 86 is capable of decoding the reproduced signal from the magnetic recording medium 200 detected by the GMR reading element of the magnetic head 82.

In the magnetic recording apparatus 500 constructed as described above, the plurality of magnetic recording media 200 are coaxially rotated by the rotary drive unit 89. The control is made during the rotation of the magnetic recording medium 200 so that the distance between the bottom surface of the magnetic head 82 and the surface of the magnetic recording medium 200 is 13 nm.

The magnetic recording apparatus 500 as described above was driven to record information under a condition in which the linear recording density was 1,000 kBPI and the track density was 150 kTPI while maintaining the magnetic spacing (distance between the main magnetic pole surface of the magnetic head 82 and the surface of the recording layer of the magnetic recording medium 200) to be 13 nm. The recorded information was reproduced to evaluate the recording and reproduction characteristics. As a result, the obtained total S/N's were 26.3 dB for the medium of Example 1, 25.7 dB for the medium of Example 2, and 25.3 dB for the medium of Example 3, respectively. The recording and the reproduction were successfully performed at a recording density, i.e., a surface recording density of 100 to 500 gigabits/square inch.

The following basic performance test was carried out. That is, the recording head was subjected to the seek 100,000 times from the inner circumference to the outer circumference on the magnetic recording medium to measure the bit error of the magnetic recording medium after the head seek test as described above. As a result, the number of bit errors was not more than 10 bits/surface. An average time interval between failures of 300,000 hours was successfully achieved.

S/N was determined by using the following expression.

$$S/N = 20 \log(S_{0-p}/Nrms)$$

In the expression, $S_{0-p}$ represents the value which is a half of the reproduced signal amplitude ranging from the zero point to the peak (zero to peak), and Nrms represents the root-mean-square value of the amplitude of the noise measured by using a spectrum analyzer.

Heat-assisted Recording

When the recording is performed on the medium of the present invention, it is possible to obtain a high signal quality in the recording at a higher density by applying the magnetic field while raising the temperature of at least a portion at which the recording is performed.

The magnetic recording medium having the structure of Example 1 was used, and a focused laser beam was radiated onto an area having a diameter of about 0.76 µm including the position of the application of the recording magnetic field to raise the temperature of the area so that the temperature was not less than 200° C. at the maximum point. The laser beam had a wavelength of 650 nm. The laser beam was radiated by using an optical system based on the use of an objective lens having a lens NA of 0.85. The recording was subjected to trial at a linear recording density of 1,000 kBPI and a track density of 700 kTPI. No laser beam was radiated during the reproduction. The reproduction was performed by using the GMR head described above in an ordinary temperature state. As a result, an S/N value of 23.2 dB was obtained for the recording and reproduction signal at the recording density as described above. The recording was similarly performed on the same medium without raising the temperature. As a result, S/N of the recording and reproduction signal was 20.7 dB. It is successfully confirmed that S/N of the recording and reproduction signal is improved by performing the recording while raising the temperature, probably for the following reason.

That is, it is considered that this improvement results from the fact that the rotation of the magnetic moment of the magnetic functional layer in the direction of the recording magnetic field tends to occur with a smaller magnetic field as the temperature is raised. In general, both of the perpendicular and in-plane magnetic anisotropy energies are decreased exponentially depending on the saturation magnetization as the temperature is raised. It has been confirmed that the angle of rotation of the magnetic moment with respect to the external magnetic field per unit is increased as the temperature is raised in accordance therewith, and the angle of rotation of the magnetic moment is steeply increased especially in the vicinity of the Curie temperature. It is considered that the magnetization of the magnetic functional layer is directed in the direction of the applied magnetic field in the state in which the temperature is raised owing to this function, the function, in which the magnetization thereof assists the applied magnetic field with respect to the magnetization of the magnetic recording layer, is exhibited more effectively, and thus the recording and reproduction output can be obtained at high S/N.

Measurement of Thermal Demagnetization Ratio

Figure 8:
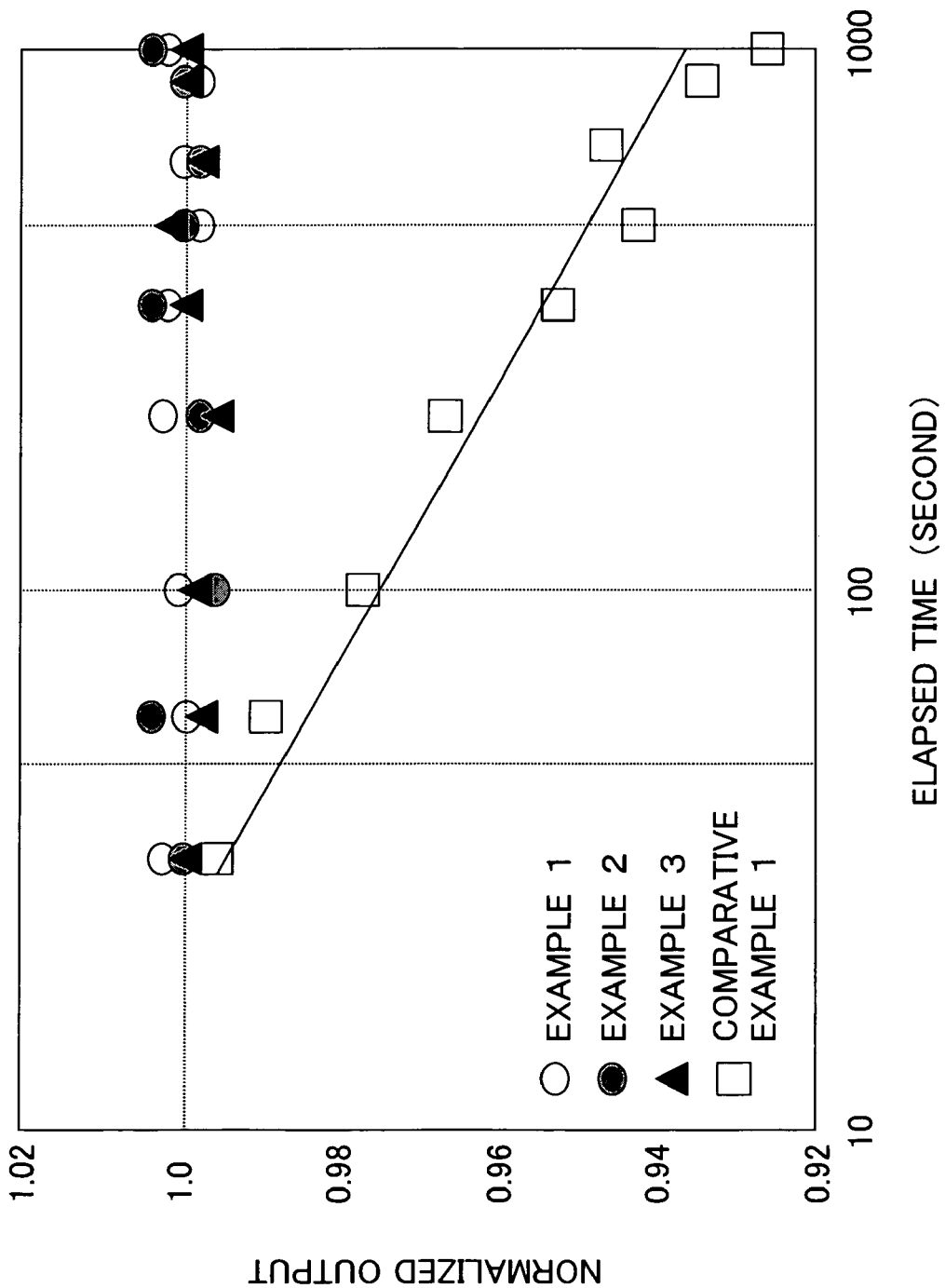
FIG. 8 shows results of the measurement of the thermal demagnetization ratio for the magnetic recording media according to the present invention and Comparative Example.

Subsequently, the thermal demagnetization ratio was measured for the magnetic recording medium. As described above, this measurement is a means to evaluate the thermal stability of the magnetic recording medium. The specified method for measuring the thermal demagnetization ratio is as follows. That is, the ratio of the change of the reproduced signal amplitude with respect to the time was investigated when the signal, which had been recorded at a linear recording density of 100 kFCI in an environment at 70° C., was reproduced. Results of the measurement are shown in FIG. 8. For the purpose of comparison, FIG. 8 shows a result of the measurement of the thermal demagnetization ratio performed similarly for the magnetic recording medium of Comparative Example 1 having no magnetic functional layer (and no transition area). As shown in FIG. 8, the normalized output is lowered as the time elapses in the case of the magnetic recording medium of Comparative Example 1. On the contrary, in the case of the magnetic recording media of Examples 1 to 3 described above, the normalized output is scarcely lowered and the thermal demagnetization is not caused even when the time elapses. That is, it is appreciated that the thermal stability is greatly improved.

In the magnetic recording medium of the present invention, the magnetic functional layer simultaneously exhibits the function of the soft magnetic under layer effectively. Therefore, the magnetic functional layer can be constructed while omitting the soft magnetic under layer as in Examples 1 and 3. However, the soft magnetic under layer can be also added between the substrate and the recording layer in order to obtain the effect to further improve the recording characteristics. Example 2 typically shows the exemplary construction thereof. However, it is also possible to construct the magnetic recording medium by using a variety of known materials. In any case, when the combination is made with the construction of the magnetic recording medium of the present invention, no problem arises even when the film thickness of the soft magnetic under layer is thin. It has been hitherto necessary that the film thickness is about 200 to 500 nm. However, in the case of the magnetic recording medium of the present invention, the effect can be sufficiently obtained with a film thickness of 150 to 200 nm. Accordingly, the excellent recording and reproduction characteristics have been successfully secured.

The function and the effect of the present invention can be also obtained by making the adjustment so that the coercive force is expressed in the in-plane direction in the soft magnetic under layer stacked in the perpendicular magnetic recording medium and adjusting the magnetic characteristics so that the expression (1) and preferably the expression (3) or the expression (2) and preferably the expression (6) are satisfied.

The construction or arrangement in relation to the magnetic recording apparatus of the present invention is not limited to those shown in the embodiments described above, which may be achieved by appropriately making the selection and the adjustment.

For example, the residual magnetization Mr in the perpendicular direction and the coercive force Hc in the in-plane direction, which are specified in this specification, basically reside in the results obtained by performing the measurement in the state in which the stacking or lamination is completed for the magnetic recording medium. However, in the magnetic recording medium, the magnetization of the recording layer mainly contributes in relation to the residual magnetization in the perpendicular direction, while the coercive force in the in-plane direction is mainly generated by the in-plane magnetized film (magnetic functional layer). Therefore, the magnetic recording medium can be also evaluated by using the numerical values obtained by measuring the layers singly respectively. When the measurement is performed, VSM is used for both of the perpendicular direction and the in-plane direction. The measurement is performed by applying an external magnetic field of 10 to 15 kOe at the maximum.

In general, the recording density (linear recording density) in the direction parallel to the recording track is higher than the recording density (track recording density) in the direction perpendicular to the recording track. Therefore, it is important that the magnetism in the in-plane direction is measured in parallel to the recording track direction.

On the other hand, when the present invention is carried out, the typical means is the addition of the in-plane magnetized film (magnetic functional layer) having the coercive force in the in-plane direction. It is preferable that the axis of easy magnetization of the magnetic functional layer is directed in the in-plane direction and in the direction perpendicular to the recording track, i.e., in the radial direction in the case of the disk-shaped medium. Therefore, it is also important that the measurement is performed perpendicularly to the recording track direction when the magnetism in the in-plane direction is measured in order to confirm or exhibit the effect of the present invention. In the embodiments described above, the coercive force in the in-plane direction has been measured in the direction perpendicular to the recording track (in the radial direction of the medium).

The magnetic recording medium of the present invention resides in the magnetic recording medium comprising at least the recording layer which is provided directly or indirectly on the substrate and which has the axis of easy magnetization in the direction perpendicular to the substrate surface. The magnetic recording medium satisfies the relational expressions of the expressions (1), (2), and (3) or the expressions (4) and (5). Accordingly, it is possible to realize the magnetic recording apparatus and the magnetic recording medium in which the S/N value is high when the high density recording is performed and the thermal stability of recorded information is high. Therefore, the magnetic recording medium of the present invention and the magnetic recording and reproducing apparatus including the same are extremely effective for the high density recording of not less than 100 gigabits/square inch.

What is claimed is:

1. A magnetic recording medium comprising
a substrate,
a magnetic functional layer which is provided on the substrate, and
a magnetic recording layer which has perpendicular magnetic anisotropy,
wherein the following expression is satisfied:

$$-4 \times 2\pi Ms^2 \leq Ku \leq 6 \times 2\pi Ms^2$$

provided that Ku represents a perpendicular magnetic anisotropy constant of the magnetic functional layer and Ms represents a saturation magnetization, and
wherein the magnetic functional layer has a coercive force in an in-plane direction.

2. The magnetic recording medium according to claim 1, wherein the magnetic functional layer is an alloy layer containing at least Co and Pt or Pd, or an alternately stacked multilayer film which is composed of one or more layers containing Co and one or more layers containing Pt or Pd.

3. The magnetic recording medium according to claim 1, wherein the magnetic recording layer is a multilayer film in which one or more layers containing Pd and one or more layers containing Co are alternately stacked.

4. The magnetic recording medium according to claim 1, wherein the magnetic recording layer is an alloy layer which contains at least CoCr.

5. A recording method on the magnetic recording medium as defined in claim 1, the recording method comprising heating a recording portion of the magnetic recording medium and applying a recording magnetic field during recording.

6. A magnetic recording apparatus provided with the magnetic recording medium as defined in claim 1, the magnetic recording apparatus comprising:
- a magnetic head which records and/or reproduces information; and
- a drive unit which drives the magnetic recording medium with respect to the magnetic head.

7. A magnetic recording apparatus provided with the magnetic recording medium as defined in claim 1, the magnetic recording apparatus comprising:
- a magnetic head provided with a device which records and/or reproduces information and a light-radiating device which raises a temperature of a recording portion; and
- a drive unit which drives the magnetic recording medium with respect to the magnetic head.

8. A magnetic recording medium comprising
a substrate, and
a magnetic recording layer which is provided directly or indirectly on the substrate and which has an axis of easy magnetization in a direction perpendicular to a substrate surface,
wherein the following relational expression is satisfied:

$$0.05 \leq Hc/Mr \leq 2.5$$

provided that Hc (Oe) represents a coercive force of the magnetic recording medium in a direction perpendicular to a recording track in an in-plane direction of the magnetic recording medium, and Mr (emu/cc) represents a residual magnetization of the magnetic recording medium in the direction perpendicular to the substrate surface.

9. The magnetic recording medium according to claim 8, wherein Mr satisfies $50 \leq Mr \leq 500$.

10. The magnetic recording medium according to claim 8, wherein the magnetic recording layer is a multilayer film in which one or more layers containing Pd and one or more layers containing Co are alternately stacked.

11. The magnetic recording medium according to claim 8, wherein the magnetic recording layer is an alloy layer which contains at least CoCr.

12. A recording method on the magnetic recording medium as defined in claim 8, the recording method comprising heating a recording portion of the magnetic recording medium and applying a recording magnetic field during recording.

13. A magnetic recording apparatus provided with the magnetic recording medium as defined in claim 8, the magnetic recording apparatus comprising:
- a magnetic head which records and/or reproduces information; and
- a drive unit which drives the magnetic recording medium with respect to the magnetic head.

14. A magnetic recording apparatus provided with the magnetic recording medium as defined in claim 8, the magnetic recording apparatus comprising:
- a magnetic head provided with a device which records and/or reproduces information and a light-radiating device which raises a temperature of a recording portion; and
- a drive unit which drives the magnetic recording medium with respect to the magnetic head.

15. A magnetic recording medium comprising
a substrate, and
a magnetic recording layer which is provided directly or indirectly on the substrate and which has an axis of easy magnetization in a direction perpendicular to a substrate surface,
wherein the following relational expression is satisfied:

$$0.8 \times 10^4 Hc/M \leq 0.5 \times 10^7$$

provided that Hc (Oe) represents a coercive force of the magnetic recording medium in a direction perpendicular to a recording track in an in-plane direction of the magnetic recording medium, and M (emu/cm$^2$) represents a residual magnetic moment per unit area of the magnetic recording medium as measured in the direction perpendicular to the substrate surface.

16. The magnetic recording medium according to claim 15, wherein M satisfies $0.03 \times 10^{-3} \leq M \leq 3 \times 10^{-3}$.

17. The magnetic recording medium according to claim 15, further comprising a magnetic functional layer.

18. The magnetic recording medium according to claim 17, wherein the magnetic functional layer is an alloy layer containing at least Co and Pt or Pd, or an alternately stacked multilayer film which is composed of one or more layers containing Co and one or more layers containing Pt or Pd.

19. The magnetic recording medium according to claim 15, wherein the magnetic recording layer is a multilayer film in which one or more layers containing Pd and one or more layers containing Co are alternately stacked.

20. The magnetic recording medium according to claim 15, wherein the magnetic recording layer is an alloy layer which contains at least CoCr.

21. A recording method on the magnetic recording medium as defined in claim 15, the recording method comprising heating a recording portion of the magnetic recording medium and applying a recording magnetic field during recording.

22. A magnetic recording apparatus provided with the magnetic recording medium as defined in claim 15, the magnetic recording apparatus comprising:
- a magnetic head which records and/or reproduces information; and
- a drive unit which drives the magnetic recording medium with respect to the magnetic head.

23. A magnetic recording apparatus provided with the magnetic recording medium as defined in claim 15, the magnetic recording apparatus comprising:
- a magnetic head provided with a device which records and/or reproduces information and a light-radiating device which raises a temperature of a recording portion; and
- a drive unit which drives the magnetic recording medium with respect to the magnetic head.

* * * * *